(12) United States Patent
Akiyama et al.

(10) Patent No.: US 7,992,053 B2
(45) Date of Patent: Aug. 2, 2011

(54) SYSTEM FOR DETECTING PATTERN OF EVENTS OCCURRED IN INFORMATION SYSTEM

(75) Inventors: Kazuhito Akiyama, Tokyko (JP); Yasutaka Nishimura, Kanagawa-ken (JP); Tadashi Tsumura, Kangawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/137,581

(22) Filed: Jun. 12, 2008

(65) Prior Publication Data

US 2008/0320326 A1  Dec. 25, 2008

(30) Foreign Application Priority Data

Jun. 20, 2007  (JP) .................................. 2007-162085

(51) Int. Cl.
*G06F 11/00* (2006.01)
(52) U.S. Cl. ..................................... 714/47.1; 714/47.2
(58) Field of Classification Search .................... 714/47, 714/47.1, 47.2, 44
See application file for complete search history.

(56) References Cited

U.S. PATENT DOCUMENTS

| 2005/0172162 | A1* | 8/2005 | Takahashi et al. ................. 714/4 |
| 2007/0168743 | A1* | 7/2007 | Ramamurthy et al. ......... 714/38 |
| 2007/0168789 | A1* | 7/2007 | Udell ............................. 714/724 |
| 2008/0320326 | A1* | 12/2008 | Akiyama et al. .................. 714/5 |
| 2008/0320495 | A1* | 12/2008 | Akiyama et al. .............. 719/318 |
| 2009/0113250 | A1* | 4/2009 | Meijer et al. ..................... 714/43 |
| 2009/0132203 | A1* | 5/2009 | Shimada et al. .............. 702/184 |
| 2009/0172034 | A1* | 7/2009 | Aoyama et al. ............ 707/104.1 |

FOREIGN PATENT DOCUMENTS

| JP | 09-265460 | 10/1997 |
| JP | 10-334058 | 12/1998 |
| JP | 11-224214 | 8/1999 |
| JP | 2003-296129 | 10/2003 |
| JP | 2006-209206 | 8/2006 |

OTHER PUBLICATIONS

"An Architectural Blueprint For Automatic Computing", Autonomic Computing White Pages, G507-2065-00, IBM Corporation, Fourth Edition, Jun. 2006.
NIWS Corp.; What is Autonomic Computing?; First edition, Softbank Publishing Inc.; Feb. 19, 2005.
Biazetti; Realizing Compund Event Processing Using Active Correlation Technology; Jun. 16, 2009.

* cited by examiner

*Primary Examiner* — Philip Guyton
(74) *Attorney, Agent, or Firm* — Steven E. Bach

(57) ABSTRACT

A system has a plurality of information processing apparatuses, each comprising: a storage device that stores, for each occurrence pattern of events to be detected, a plurality of tasks for respectively determining whether a plurality of conditions are fulfilled; a process determination section that, in response to occurrence of an event, reads the plurality of tasks corresponding to the occurrence pattern including the event from the storage device, and determines which information processing apparatus is assigned to process each read task; a process execution section that processes a task assigned to be processed by the information processing apparatus, and instructs another information processing apparatus to process another task assigned to be processed by the other information processing apparatus; and a detection section that determines that the event has occurred if process results of the processed task and the instructed task fulfill the plurality of conditions.

15 Claims, 21 Drawing Sheets

```
 1: <muws1:ManagementEvent muws1:ReportTime="2006-11-22T21:12:26+09:00">
 2: muws2:sequenceNumber=0">
 3: <muws1:EventId>uuid:CEA1DB7A22B7BCEBD0C707E4F6F350AE47</muws1:EventId>
 4: <muws1:SourceComponent>
 5:     <muws1:ResourceId>device://something_decided_by_WSDM_setResouceID</muws1:ResourceId>
 6:     <eac:ResourceType>IBM Printer 88008</eac:ResourceType>
 7:     <eac:ComponentIdentification eac:component="Copier function"
 8: eac:subComponent="Output"/>
 9: </muws1:SourceComponent>
10: <muws2:Situation>
11:     <muws2:SituationCategory>
12:         <muws2:ReportSituation/>
13:     </muws2:SituationCategory>
14:     <muws2:SituationTime>2006-11-22T21:12:26+09:00</muws2:SituationTime>
15:     <muws2:Priority>0</muws2:Priority>
16:     <muws2:Severity>0</muws2:Severity>
17:     <muws2:Message>PRNT0001W: no papers</muws2:Message>
18:     <muws2:SubstitutableMsg muws2:MsgId="PRINT0001"
19: musw2:msgIDType="http://printer.ibm.com/type8000">
20:     </muws2:SubstitutableMsg>
21: </muws2:Situation>
22: <eac:Destination> </eac:Destination>
23: <eac:EventStored>true</eac:EventStored>
24: <eac:ExtendedContent eac:name="printingCount">
25:     <eac:values>756</eac:values>
26: </eac:ExtendedContent>
27: </muws1:ManagementEvent>
```

FIG. 3B

| EVENT ID | EVENT | | | SENDER ID | DELETED FLAG | RECEIVER ID |
| --- | --- | --- | --- | --- | --- | --- |
| | TIME | SOURCE | CONTENT | | | |
| ... | ... | ... | ... | ... | ... | ... |
| 1234 | 06:00 | 100E | PRIORITY 0 | 100D | — | — |
| ... | ... | ... | ... | ... | ... | ... |
| 2345 | 06:10 | 100E | — | — | ✓ | 100A |
| ... | ... | ... | ... | ... | ... | ... |
| 3456 | 07:10 | 100D | PRIORITY 1 | — | — | 100A |
| ... | ... | ... | ... | ... | ... | ... |

| DEVICE ID | REQUESTED EVENT DATA | NECESSARY EVENT DATA | DETECTABLE EVENT DATA |
|---|---|---|---|
| 100A | 1234, 2345, ... | — | — |
| 100D | 5678, 6789, ... | — | — |
| 100C | — | 1234, ... | 3456, ... |

FIG. 5

SYSTEM FOR DETECTING PATTERN OF EVENTS OCCURRED IN INFORMATION SYSTEM

FIELD OF THE INVENTION

The present invention relates to a technique of detecting events which have occurred in an information system. Particularly, the present invention relates to a technique of detecting if events have occurred in a predetermined occurrence pattern.

BACKGROUND ART

A computer system not only may face a problem, such as an operational failure or a performance failure, but also may need to change the system setting when the setting does not match with the purpose of the computer system. The occurrence of such a problem or the need to change the setting is called "symptom". Detecting and attending to a symptom can ensure efficient and safe management of a computer system. Because recent computer systems are complex, however, it is not easy to detect and attend to a symptom when occurred therein.

There has been proposed a technique of allowing a computer to detect and attend to a symptom occurred therein (see "Blueprint on autonomic computing architecture" URL: http://www-06.ibm.com/jp/autonomic/pdf/2006_AC_Blueprint_2006_06.pdf)

In autonomic computing, a system of detecting and attending to symptoms is called an autonomic manager, which includes analysis, plan and execution functions (see pp. 10-11 of the above article). To add a new function to the autonomic manager to be able to, for example, detect a new symptom, a knowledge base is used (see p. 12 of the above article). To adequately function the system, therefore, it is desirable to sufficiently collect information of events needed for analysis first, then permit the use of a sufficient processing capability to achieve a plan and execution thereof, and further to provide a sufficient storage area for storing the knowledge base.

Recent devices, such as cellular phones, PDAs (Personal Data Assistants) and home appliances, are equipped with various functions of a computer. However, those devices do not have a sufficient processing capability or a sufficient storage area, thus making it difficult to allow those devices to adequately operate an autonomic manager. It is also difficult to detect occurrence of a specific symptom from the operation of a device itself. Such a specific symptom may occur due to complex factors including a server which communicates with the device. Even with a sufficient processing capability, therefore, it may not be proper for each device to operate an autonomic manager.

Because such devices are becoming exceedingly popular recently, a server may not be able to intensively manage symptoms occurred in individual devices due to the insufficient processing capability of the server. Those devices often suffer an unstable communication state, so that the server may not adequately collect the statuses of the individual devices even if it tries. Further, a system which allows each device to request the server to detect and attend to a symptom takes a longer process time by the time needed for a communication process, as compared with a case where a device itself detects and attends to a symptom. This is likely to reduce the operability and convenience.

SUMMARY OF THE INVENTION

Accordingly, it is an object of the present invention to provide a system, an information processing apparatus, a method and a program which can solve the foregoing problems. The object is achieved by combinations of the features described in independent claims in the appended claims. Dependent claims define further advantageous specific examples of the present invention.

To solve the problems, according to a first aspect of the present invention, there is provided a system that has a plurality of information processing apparatuses and detects if events have occurred in the plurality of information processing apparatuses in a predetermined occurrence pattern, each of the plurality of information processing apparatuses comprising a storage device that stores, for each occurrence pattern of events to be detected, a plurality of tasks for respectively determining whether a plurality of conditions are fulfilled; a process determination section that, in response to occurrence of an event, searches the storage device for an occurrence pattern including the event, reads a plurality of tasks corresponding to the searched occurrence pattern from the storage device, and determines which information processing apparatus is caused to process each of the read tasks; a process execution section that processes a task determined to be processed by that information processing apparatus, and instructs another information processing apparatus to process a task determined to be processed by the other information processing apparatus; and a detection section that determines that the event has occurred in the predetermined occurrence pattern under a condition that process results of the task processed by the information processing apparatus and the task allowed to be processed by the other information processing apparatus fulfill the plurality of conditions. There are also provided an information processing apparatus provided in the system, a method for allowing the information processing apparatus to detect events, and a program that allows the information processing apparatus to detect events.

BRIEF DESCRIPTION OF THE DRAWINGS

FIG. 3B is a diagram showing a specific example of the event body 300 according to the embodiment.

FIG. 4 is a diagram showing one example of the data structure of the event storage section 210 according to the embodiment.

FIG. 5 is a diagram showing one example of the data structure of the node information storage section 220 according to the embodiment.

BEST MODE FOR CARRYING OUT THE INVENTION

The present invention will be described below by way of the best mode of carrying out the invention. However, an embodiment and modifications thereof described below do not limit the scope of the invention recited in the appended claims, or all the combinations of the features of the embodiment to be described should not necessarily be the means for solving the invention.

Figure 1:
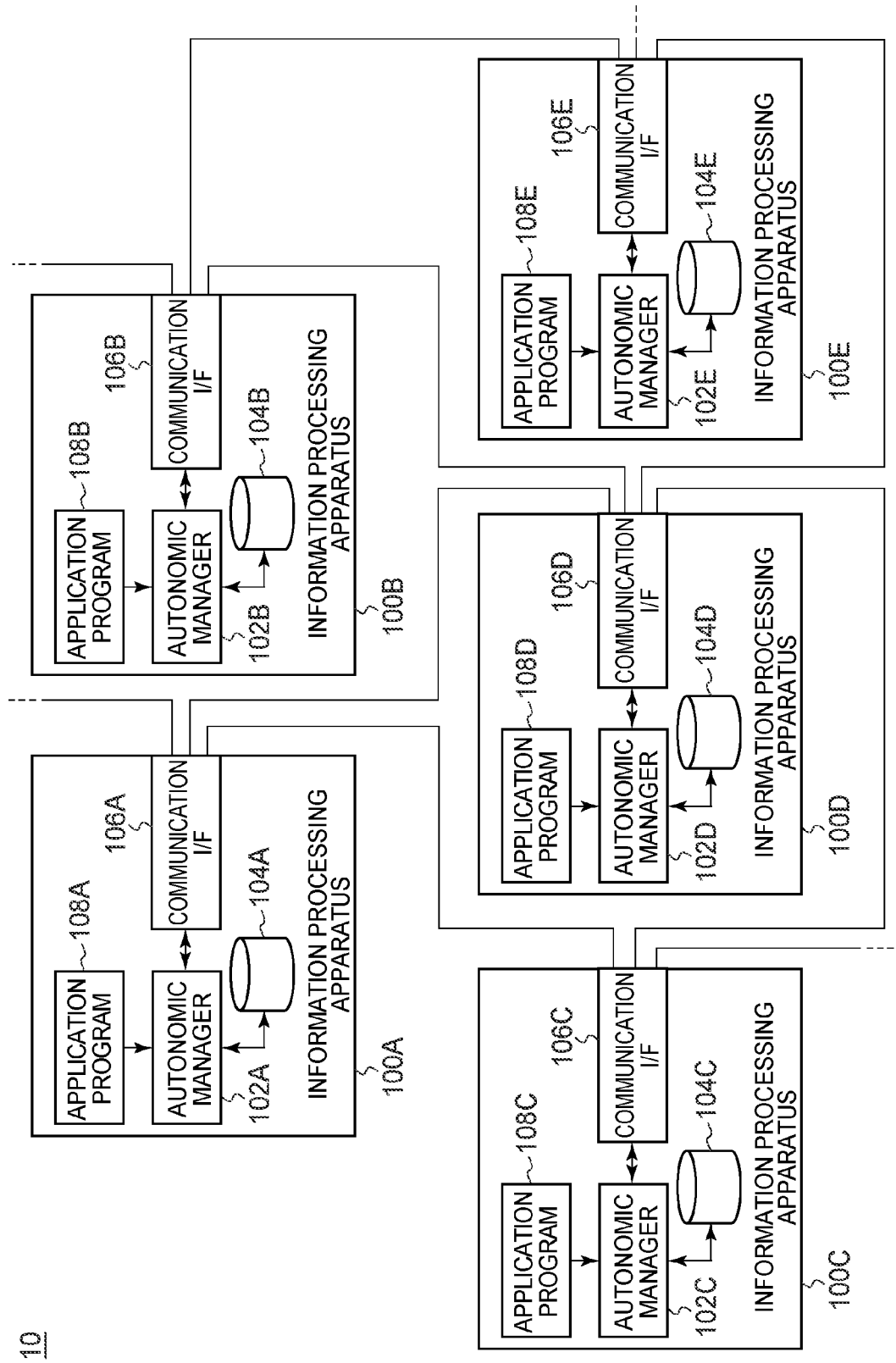
FIG. 1 is a diagram showing the general configuration of the information system 10 according to the embodiment.

FIG. 1 shows the general configuration of an information system 10 according to the embodiment. The information system 10 includes a plurality of information processing apparatuses, e.g., an information processing apparatus 100A, an information processing apparatus 100B, an information processing apparatus 100C, an information processing apparatus 100D, and an information processing apparatus 100E. Each of the information processing apparatuses 100A to 100E is a general-purpose apparatus, such as a personal computer, a server or a host computer. Instead, each of the information processing apparatuses 100A to 100E may be a special-purpose device, such as a an input/output (I/O) device like a printer or a scanner, a network switch, or an NAS (Network Attached Storage). Further, each of the information processing apparatuses 100A to 100E may be a device provided in a portable or mobile unit, such as a cellular phone, a PDA, a car navigation system or an audio player. Furthermore, each of the information processing apparatuses 100A to 100E may be a home appliance, such as a video camera.

Each of the information processing apparatuses 100A to 100E has a storage device, a communication interface and a CPU (Central Processing Unit) as the basic hardware configuration. With processing by the CPU, each of the information processing apparatuses 100A to 100E runs at least one application program and an autonomic manager. The storage device and the communication interface provided in the information processing apparatus 100A are shown at 104A and 106A, respectively, the application program which runs on the information processing apparatus 100A is shown at 1-8A, and the autonomic manager provided in the information processing apparatus 100A is shown at 102A. The information processing apparatuses 100B to 100E have similar hardware and software components which are given with reference symbols respectively having suffixes "B" to "E" added to corresponding numerals of the components.

While the information processing apparatus 100A is directly connected to each of the information processing apparatuses 100C and 100D, the information processing apparatus 100A is not directly connected to the information processing apparatuses 100B and 100E. While the information processing apparatus 100B is directly connected to each of the information processing apparatuses 100D and 100E, the information processing apparatus 100B is not directly connected to the information processing apparatuses 100A and 100C. The information processing apparatus 100D is directly connected to each of the information processing apparatuses 100A, 100B, 100C and 100E. The connection may be achieved by wired or wireless communication, or a combination thereof. The term "connection" should not necessarily mean establishment of a physical communication path, and may, in practice, mean a logical communication path over a broadcast type network. The communication interfaces 106A to 106E provided in the information processing apparatuses 100A to 100E communicate with one another through those physical or logical communication paths. Because the information processing apparatuses are connected in a graphical fashion, each information processing apparatus may be referred to as "node" as if it were treated as a node in a graph.

Since the individual information processing apparatuses operate in approximately the same way, the information processing apparatus 100C will be described in detail below as a representative apparatus. The information processing apparatus 100C has an autonomic manager 102C, a storage device 104C, a communication interface 106C, and an application program 108C. The autonomic manager 102C detects if events have occurred in the information system 10 in a predetermined occurrence pattern. To achieve the detection, first, pattern data indicating an occurrence pattern to be detected is stored in the storage device 104C. The autonomic manager 102C acquires an event which has occurred in the application program 108C therefrom, or acquires an event which has occurred in another information processing apparatus via the communication interface 106C. Then, the autonomic manager 102C determines whether an occurrence pattern for the acquired events matches with the pattern data stored in the storage device 104C.

When there is a match, the autonomic manager 102C notifies a user of the occurrence of a predetermined symptom in the information system 10, or changes the setting in a predetermined manner. Each of the autonomic managers 102A, 102B, 102D and 102E, like the autonomic manager 102C, detects the occurrence of an event and attends to the event individually. It is to be noted that each of the storage devices 104A to 104E may store pattern data different from those of the other storage devices. Each of the storage devices 104A to 104E should desirably store only an occurrence pattern which is adequately detected in the information processing apparatus that has the storage device. Accordingly, occurrence patterns to be detected in the information processing apparatuses 100A to 100E can be made different from one another, so that the overall pattern detection process can be distributed to a plurality of apparatuses.

The information system 10 according to the embodiment aims at detecting a pattern of events by the cooperation of the information processing apparatuses each of which independently stores events and pattern data.

Figure 2:
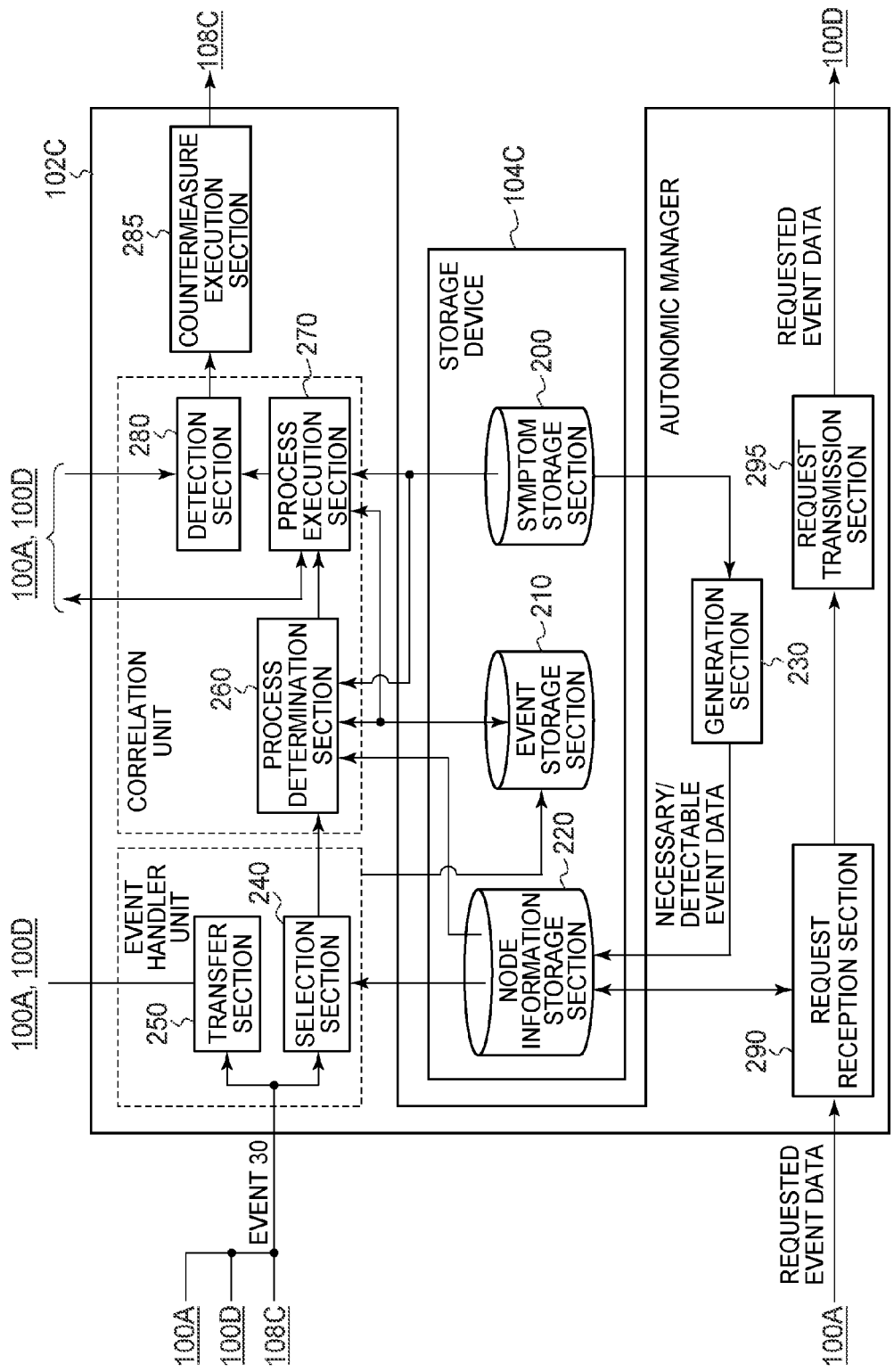
FIG. 2 is a diagram showing the functional structure of the autonomic manager 102C according to the embodiment in association with the data structure of the storage device 104C.

FIG. 2 shows the functional structure of the autonomic manager 102C according to the embodiment in association with the data structure of the storage device 104C. The autonomic manager 102C includes an event handler unit, a correlation unit, a countermeasure execution section 285, a generation section 230, a request reception section 290 and a request transmission section 295. The storage device 104C has a symptom storage section 200, an event storage section 210 and a node information storage section 220. The symptom storage section 200 stores at least one piece of pattern data indicating an occurrence pattern of events to be detected in the information processing apparatus 100C. Pattern data includes a plurality of tasks, for example. Each of the tasks determines whether each of a plurality of conditions to determine that events have occurred in the occurrence pattern is satisfied. In addition, the symptom storage section 200 stores a countermeasure process or the like which is to be executed when events have occurred in the occurrence pattern. A set of such pattern data and countermeasure process or the like is called symptom data, which will be specifically described later referring to FIGS. 6A and 6B.

The event storage section 210 is a storage area provided in the storage device 104C to store an event which has occurred in the application program 108C and an event acquired externally. The node information storage section 220 stores a collection of events needed for the detection by the information processing apparatus 100C, and events requested by another information processing apparatus to transfer which needs the events. Specific examples of the event storage section 210 and the node information storage section 220 will also be described later referring to FIGS. 4 and 5. The generation section 230 reads pattern data from the symptom storage section 200 and specifies a collection of events to be detected in an occurrence pattern indicated by the pattern data. (Note that an event to be detected in one occurrence pattern will also be called an event included in the occurrence pattern hereinafter.) Then, the generation section 230 generates necessary event data indicating the specified collection of events, and stores it in the node information storage section 220.

In addition, the generation section 230 may specify an occurrence pattern of events detectable in the information processing apparatus 100C based on the processing capability and process load of the information processing apparatus 100C. In this case, the generation section 230 generates detectable event data indicating a collection of events included in any one of the specified occurrence patterns, and stores the detectable event data in the node information storage section 220. In this case, further, the generation section 230 may update the generated detectable event data based on changes in the processing capability and process load of the information processing apparatus 100C. In accordance with the update of the detectable event data, the generation section 230 sends the updated detectable event data to another information processing apparatus 100 adjacent to the information processing apparatus 100C so that the adjacent information processing apparatus 100 updates necessary event data.

The event handler unit determines whether an event which has occurred in the information processing apparatus 100C (i.e., application program 108C) and an event transferred from another information processing apparatus are to be processed by the information processing apparatus 100C or to be transferred to another information processing apparatus to be processed therein. Specifically, the event handler unit has a selection section 240 and a transfer section 250. The selection section 240 acquires an event which has occurred in the information processing apparatus 100C (i.e., application program 108C) and an event transferred from another information processing apparatus. It is desirable that the selection section should acquire an event only from an information processing apparatus adjacent to the information processing apparatus 100C (i.e., connected directly to the information processing apparatus 100C without intervening any other information processing apparatus). In the embodiment, for example, the information processing apparatus 100C acquires an event from the information processing apparatus 100A or the information processing apparatus 100D. Data indicating the acquired event is event data 30.

The selection section 240 selects an event included in the necessary event data or detectable event data generated by the generation section 230 from occurred/acquired events. Then, the selection section 240 stores the selected event in the event storage section 210, and notifies a process determination section 260 of the selected event. Under a condition that a free space of the event storage section 210 is equal to or larger than a predetermined size, the selection section 240 may store even an event not included in necessary/detectable event data in the event storage section 210.

The transfer section 250 transfers an event which is included in neither the necessary event data nor the detectable event data to another information processing apparatus, e.g., the information processing apparatus 100A or the information processing apparatus 100D. Instead or in addition, the transfer section 250 may select and transfer an occurred event, if included in requested event data corresponding to another information processing apparatus, to the other information processing apparatus, regardless of whether the occurred event is included in the necessary event data or the like.

Based on the selected event, the correlation unit determines whether an occurrence pattern of events including the event matches with a predetermined pattern, and outputs a determination result. Specifically, the determination on pattern matching is made based on the degree of correlation when a pattern including a newly occurred event is compared with the history of occurrence of events, as well as on perfect matching. The determination technology is known as, for example, ACT (Active Correlation Technology). The correlation unit has an additional function of realizing the pattern detection process in cooperation with another information processing apparatus. Specifically, the correlation unit has the process determination section 260, a process execution section 270 and a detection section 280.

Upon reception of notification of the occurrence of an event from the selection section 40, the process determination section 260 searches the symptom storage section 200 for an occurrence pattern including the occurred event, and reads a plurality of tasks corresponding to the found occurrence pattern from the symptom storage section 200. Then, the process determination section 260 determines which information processing apparatus should process each of the tasks read. The determination may be made based on data that indicates, for each task, which information processing apparatus should process that task, or based on a transfer record for events necessary for the processing of the task.

The process execution section 270 processes a task which is determined to be processed by the information processing apparatus 100C. The process execution section 270 also instructs another information processing apparatus to process a task which is determined to be processed by that information processing apparatus. The detection section 280 detects if the events notified by the selection section 240 match with an occurrence pattern indicated by the pattern data, and outputs a detection result. The detection process is realized by determining whether each condition determined by each task is fulfilled. Accordingly, the detection section 280 determines whether the detection is possible or not based on the result of the task executed by another information processing apparatus in addition to the result of the process executed by the process execution section 270. Under a condition that the events have occurred in the occurrence pattern, the countermeasure execution section 285 reads a countermeasure process stored in the symptom storage section 200 in association with the pattern data, and executes the countermeasure process. The countermeasure process is, for example, alteration of the setting in the application program 108C or the like.

The request reception section 290 and the request transmission section 295 serve to distribute necessary event data. Specifically, the distribution is carried out as follows. The request reception section 290 receives, from another information processing apparatus adjacent to the information processing apparatus 100C, requested event data indicating a collection of events requested by the adjacent other information processing apparatus to transfer. Then, the request transmission section 295 combines the received requested event data with necessary event data of the information processing apparatus 100C red from the node information storage section 220 and detectable event data to generate event data requested by the information processing apparatus 100C. The requested event data indicates a collection of events that the information processing apparatus 100C requests another information processing apparatus adjacent thereto to transfer. The request transmission section 295 sends the requested event data to the adjacent information processing apparatus. The sender of the original requested event data is excluded from a list of receivers. That is, when the information processing apparatus 100C receives the requested event data from the information processing apparatus 10A, for example, the information processing apparatus 100C transfers the requested event data to the information processing apparatus 100D.

Figure 3A:
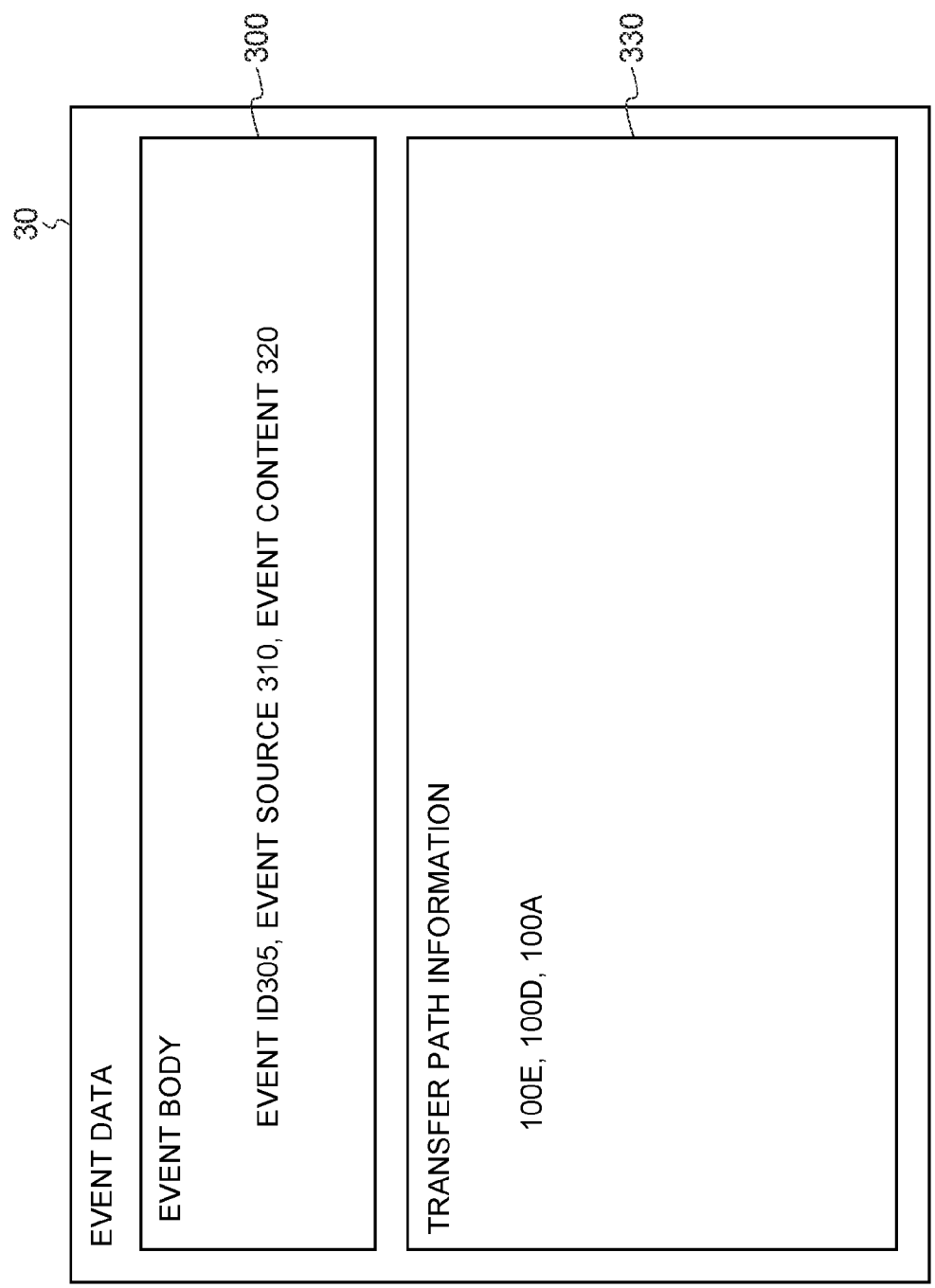
FIG. 3A is a diagram showing one example of the data structure of the event data 30 according to the embodiment.

FIG. 3A shows one example of the data structure of the event data 30 according to the embodiment. FIG. 3B shows a specific example of an event body 300 according to the embodiment. The event data 30 includes the event body 300 and transfer path information 330. The event body 300 is structured data which is described by the XML (eXtensible Markup Language) or the like, and, as an example, conforms to the event format of WSDM (Web Services Distributed Management). The transfer path information 330 includes identification information of an information processing apparatus that is a source of the event and identification information of information processing apparatuses in a transfer path. In transferring an event, the selection section 240 can exclude any apparatus which has received the event from a list of event transfer destinations by referring to the information of the transfer path.

The event body 300 includes at least an event ID 305, an event source 310 and an event content 320. As shown on line 3 in FIG. 3B, the event ID 305 is recorded in association with a tag indicating identification information of the event. As shown on lines 4 to 9 in FIG. 3B, the event source 310 includes the URL (Uniform Resource Locator) of an apparatus of the event source and the name of the apparatus. As shown on lines 10 to 21 in FIG. 3B, the event content 320 includes the detailed content of the event and a status at the time the event has occurred. In the example of FIG. 3B, it is recorded on line 17 that the printer has run out of paper. As apparent from the above, an event is information output from a hardware or software component to indicate its operational status. As is usual in this technical field, the term "event" not only indicates an operational status itself but also means data describing the operational status in the embodiment.

FIG. 4 shows one example of the data structure of the event storage section 210 according to the embodiment. The event storage section 210 stores, for each event, event identification information, data on the event, identification information of an information processing apparatus of a sender when the event has been transferred from another apparatus, a flag indicating whether the event has been deleted or not, and identification information of an information processing apparatus at a transfer destination (receiver) to which the event has been transferred. For example, an event 1234 (indicating an event with identification information "1234"; the same is applied to other events hereinafter) has occurred in the information processing apparatus 100E at 6:00 with the content indicating that the priority of the event 1234 is 0. As the event 1234 has been transferred from the information processing apparatus 100D, the transfer section 250 stores the identification information of the information processing apparatus 100D in association with the event 1234. As the transfer section 250 has neither deleted nor transferred the event 1234, the event storage section 210 has neither the deletion flag nor the receiver identification information stored for the event.

For an event deleted from the event storage section 210, the transfer section 250 stores the identification information of the event in association with the information processing apparatus to which the event has been transferred. Specifically, the event storage section 210 deletes the content of an event 2345, sets the deletion flag and stores the identification information of the receiver's information processing apparatus. Even in this case, the transfer section 250 may keep storing least necessary information to identify the category of the event, such as the event source or the time of occurrence of the event. As another example, the transfer section 250 may transfer an event regardless of whether the event has been deleted. In this case, the deletion flag is kept reset and the identification information of the receiver is stored in the event storage section 210 as is the case for an event 3456.

FIG. 5 shows one example of the data structure of the node information storage section 220 according to the embodiment. For each of other information processing apparatuses adjacent to the information processing apparatus 100C, the node information storage section 220 stores requested event data indicating a collection of events whose transfer is requested by the adjacent information processing apparatus. Specifically, requested event data of the information processing apparatus 100A is 1234, 2345, etc., and requested event data of the information processing apparatus 100D is 5678, 6789, etc. Referring to this data structure, the transfer section 250 can transfer an event to a proper apparatus. For example, the transfer section 250 can transfer the event 1234 to the information processing apparatus 100A when the information processing apparatus 100C acquires the event 1234, and can transfer the event 5678 to the information processing apparatus 100D when the information processing apparatus 100C acquires the event 5678.

Requested event data of another information processing apparatus adjacent to the information processing apparatus 100C indicates a collection of events included in necessary event data or detectable event data of that adjacent other information processing apparatus, or included in requested event data of still another information processing apparatus adjacent to that adjacent other information processing apparatus. For example, the requested event data of the information processing apparatus 100D includes necessary event data of the information processing apparatus 100B and information processing apparatus 100E as well as necessary event data of the information processing apparatus 100D. Such structure of requested event data can allow an event to adequately reach an information processing apparatus which needs the event through an adequate path passing adjacent information processing apparatuses in order. The technique of transferring requested event data to the individual apparatuses will be described later referring to FIGS. 9A and 9B and FIG. 10.

The node information storage section 220 further stores necessary event data and detectable event data of the information processing apparatus 100C itself. Because necessary event data is a collection of events needed to detect an occurrence pattern in the information processing apparatus 100C as mentioned above, it is also called interest data to mean a collection of events in which the information processing apparatus 100C is interested. In spite of the meaning, necessary event data may be determined arbitrarily according to the policy of an administrator of the information processing apparatus 100. Because detectable event data is a collection of events detectable from the viewpoint of the processing capability or the like of the information processing apparatus 100C as mentioned above, it is also called capability data. As various kinds of data are stored in the node information storage section 220, the selection section 240 can adequately determine an event to be stored in the event storage section 210 by referring to the node information storage section 220.

Figure 6A:
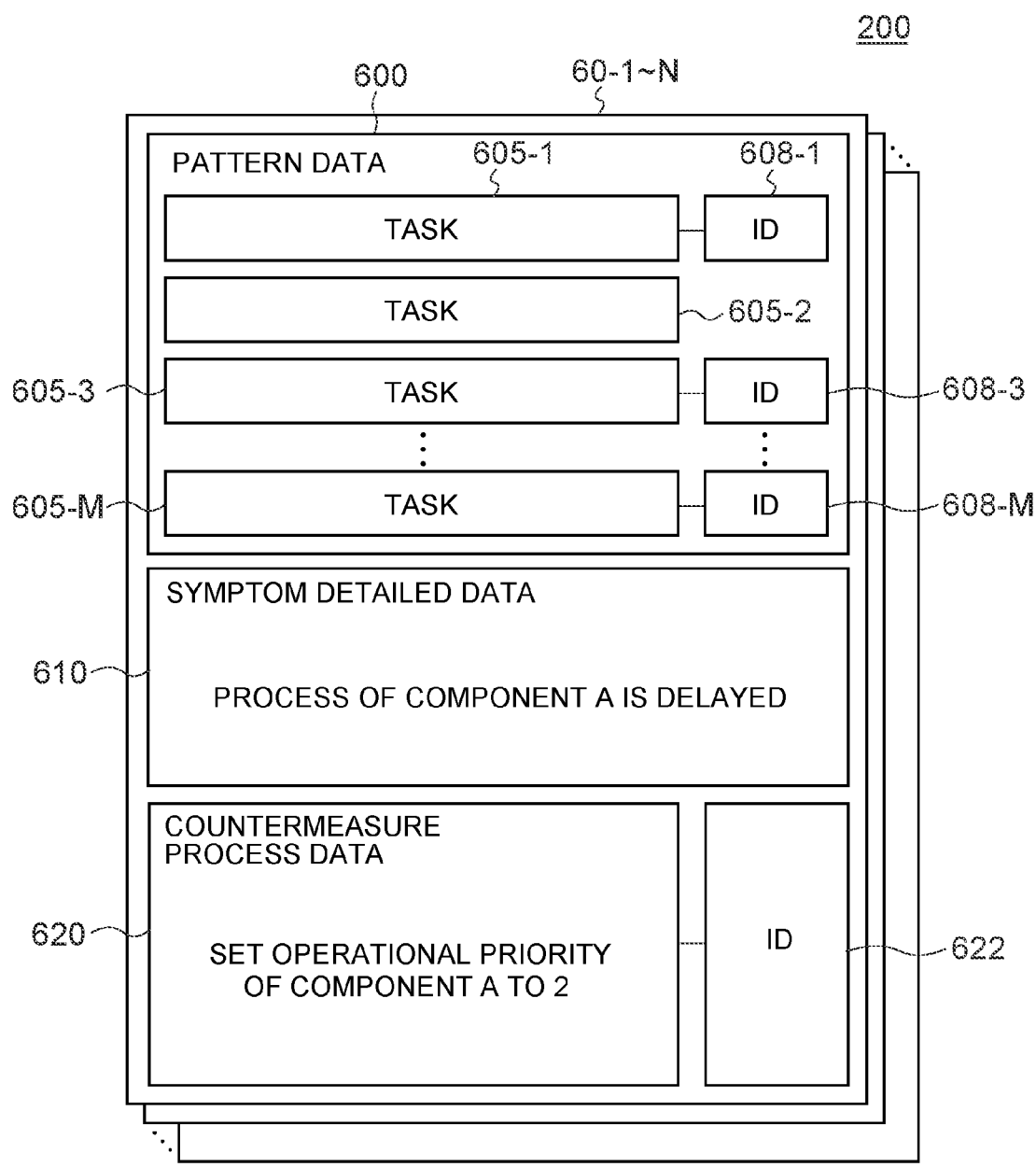
FIG. 6A is a diagram showing one example of the data structure of the symptom storage section 200 according to the embodiment.

FIG. 6A shows one example of the data structure of the symptom storage section 200 according to the embodiment. The symptom storage section 200 stores symptom data for each occurrence pattern of events to be detected. Specifically, the symptom storage section 200 stores symptom data 60-1 to 60-N. A combination of symptom data stored differs from one information processing apparatus 100 to another. The information processing apparatus 100 may store symptom data 60 in advance at the time it is shipped as a product or when the autonomic manager 102 is installed, but may acquire symptom data 60 dynamically as follows. For example, when one information processing apparatus 100 (e.g., information processing apparatus 100C) is newly connected to the information system 10, the information processing apparatus 100C requests another information processing apparatus 100 (e.g., information processing apparatus 100D) already included in the information system 10 to transfer symptom data 60. At the time of transmission, the request may be associated with attribute information, such as the location where the information processing apparatus 100C is provided and assignment of the information processing apparatus 100C. Based on the attribute information, the information processing apparatus 100D sends symptom data 60, selected from pieces of symptom data 60 stored in the symptom storage section 200 of the information processing apparatus 100D, to the information processing apparatus 100C.

Next, symptom data 60-1 as a representative of those pieces of symptom data 60-1 to 60-N will be described. The symptom data 60-1 includes pattern data 600, symptom detailed data 610 and countermeasure process data 620. The pattern data 600 indicates an occurrence pattern of events to be detected in the information processing apparatus 100C. Specifically, the pattern data 600 includes a plurality of tasks (e.g., tasks 605-1 to 605-M) respectively associated with identification information (e.g., identification information 608-1 to 608-M) of information processing apparatuses which are allowed to process the tasks.

As one example, the task 605-1 is a task to determine a condition, and is associated with identification information 608-1 of the information processing apparatus that is allowed to execute the process. There may be a task like the task 605-2, which is not associated with identification information of the information processing apparatus that is allowed to execute the process. The symptom detailed data 610 indicates a symptom which appears in the information system 10 when the condition determined by each task is fulfilled. The symptom detailed data 610 may be output when the condition is fulfilled or may be referable even if it is not used in any process when the system administrator maintains or checks the symptom data 60-1.

The countermeasure process data 620 indicates a process which is executed when an event occurs in the occurrence pattern. In this example, the details of a specific setting work, e.g., "set the operational priority of component A to 2", are recorded. The countermeasure process data 620 may indicate a process which calls a user's attention like "display information on an occurred event" besides such a specific setting work. Although the content of a setting process is described by a natural language for the sake of descriptive convenience in the embodiment, the content may, in practice, include a specific command (e.g., a method to be invoked) to make such setting and a parameter thereof. Further, the symptom storage section 200 may store identification information 622 indicating identification information of the information processing apparatus that is allowed to execute the process, in association with the countermeasure process data 620. This can allow the information processing apparatus which has finished executing all tasks to determine where to execute a later countermeasure process.

Figure 6B:
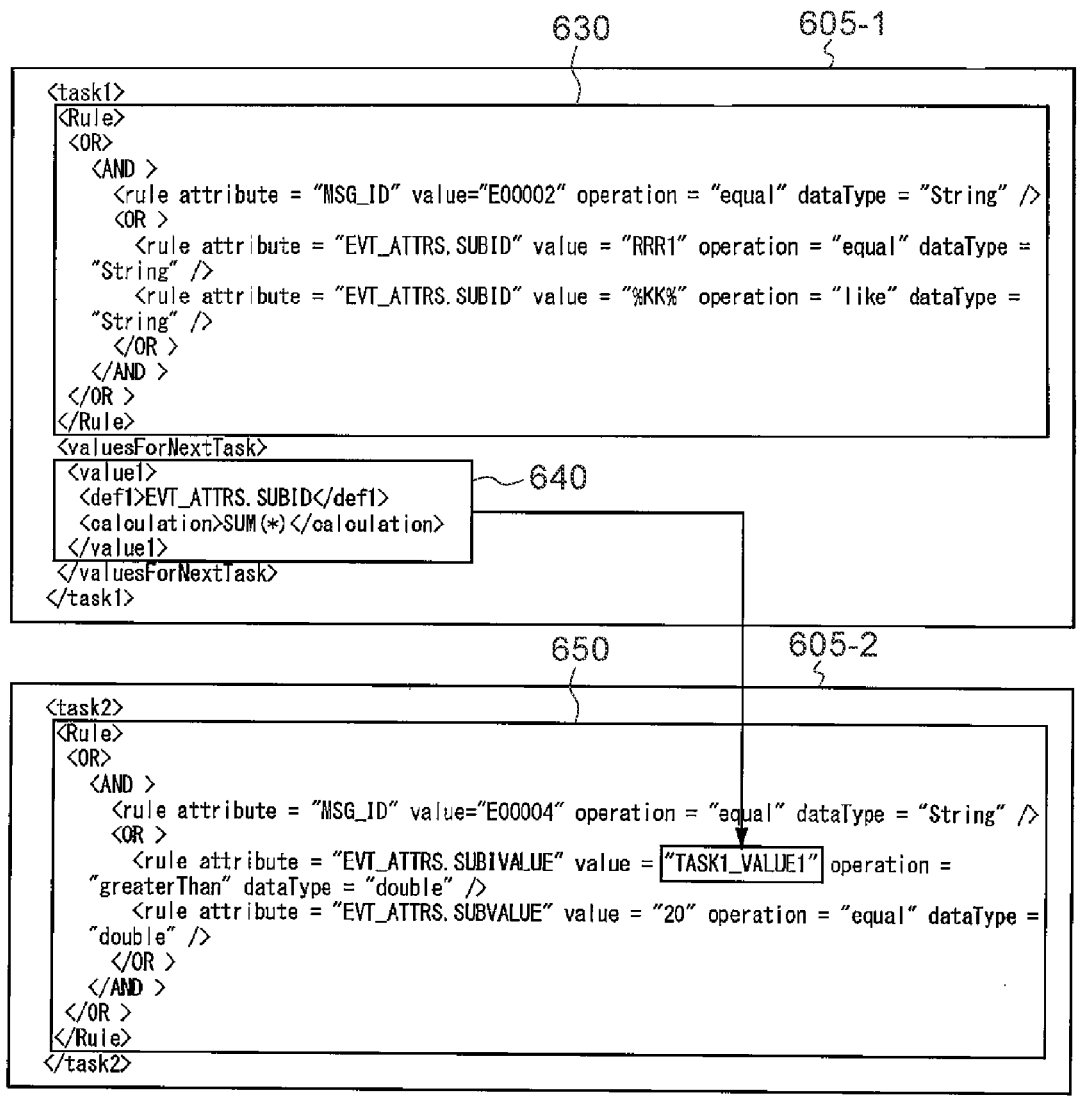
FIG. 6B is a diagram showing specific examples of the tasks 605-1 and 605-2.

FIG. 6B shows specific examples of the tasks 605-1 and 605-2. Those tasks may be structured data written by a language like XML. The task 605-1 includes a partial expression 630 and an output definition 640. The partial expression 630 indicates the entity of a determination process. For example, for each of a plurality of events, the partial expression 630 indicates that it is determined whether the ID and attribute of an occurred event take predetermined values, and an evaluation value is computed by a logical AND or logical OR operation on logic values indicative of the determination result. The output definition 640 indicates a method of computing a value to be output to another task besides the evaluation value.

The task 605-2 includes a partial expression 650. The partial expression 650, like the partial expression 630, determines the ID and attribute of each of a plurality of events, and evaluates a logical expression based on the determination result. The partial expression 650 indicates that an output value computed in the output definition 640 should be referred to in the determination process. Conditions that each task determines are not limited to those based on the ID and attribute of each event. For example, each task may determine based on the number of times of occurrence of one event, the order of occurrence of a plurality of events, whether a combination of events has occurred in a predetermined period, whether one event has not occurred, or a combination thereof.

Figure 6C:
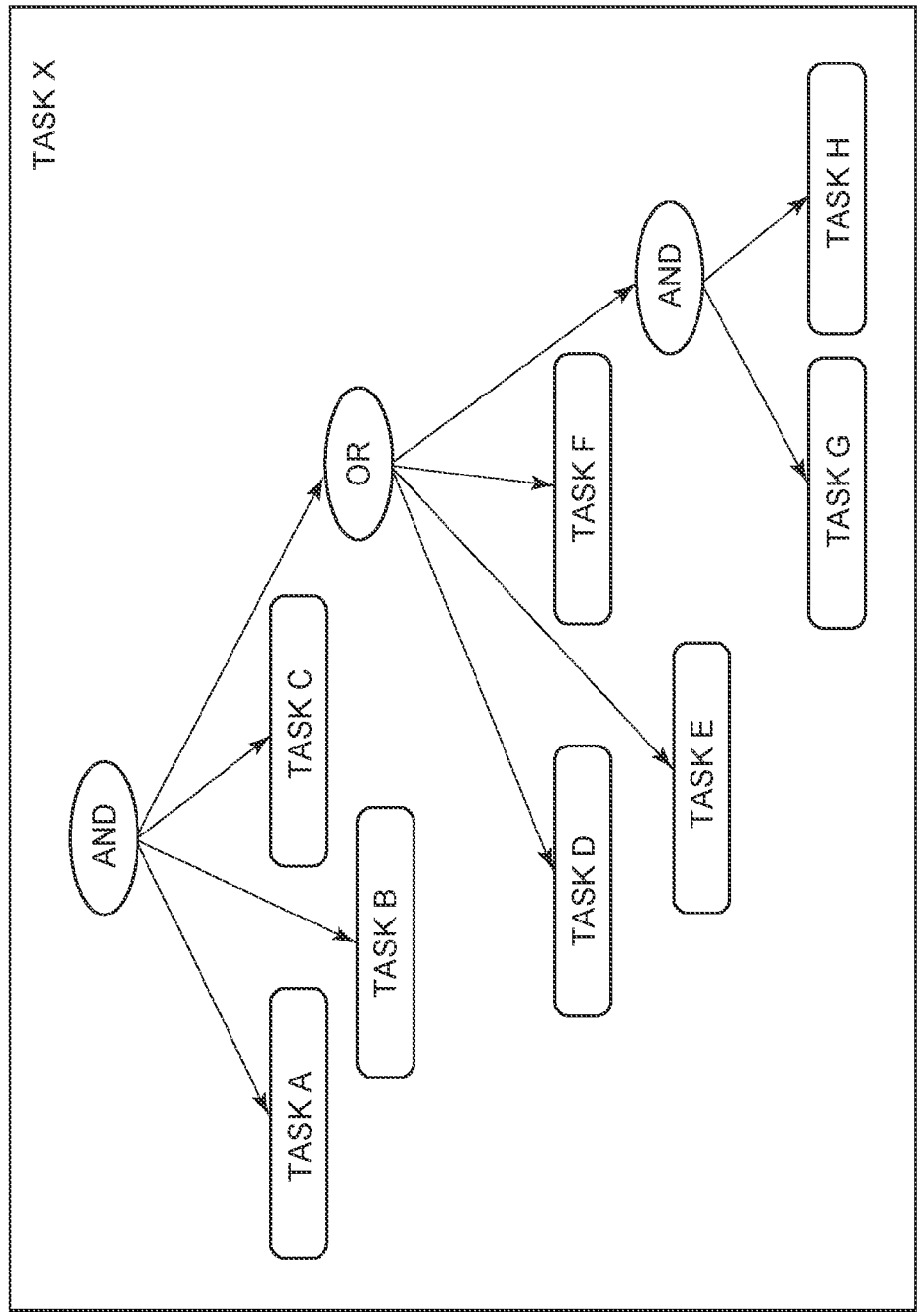
FIG. 6C is a diagram showing a specific example of a combination of tasks which are executed to detect an occurrence pattern.

As apparent from the above, each of the tasks stored in the symptom storage section 200 includes evaluation of a logical expression as a process to be executed. To evaluate the logical expression, it is necessary to evaluate a plurality of partial expressions and perform a logical operation on their evaluation values. Such evaluation of each partial expression may form an independent task. FIG. 6C shows a specific example of a combination of such partial expressions.

FIG. 6C shows a specific example of a combination of tasks which are executed to detect an occurrence pattern. In the specific example, each of a plurality of tasks (tasks A to H and X) outputs a logical value as a process result. A combination of such logical values becomes a logical expression for evaluating occurrence of events in a predetermined occurrence pattern. That is, FIG. 6C shows a logical expression associated with an occurrence pattern of events to be detected, and it is determined if the occurrence pattern has been detected based on the evaluation value of the logical expression.

Specifically, the task X first computes a logical product of a logical value indicating the output of the task G and a logical value indicating the output of the task H. Then, the task X computes a logical sum of the logical product, a logical value indicating the output of the task D, a logical value indicating the output of the task E, and a logical value indicating the output of the task F. Finally, the task X computes a logical product of the logical sum, a logical value indicating the output of the task A, a logical value indicating the output of the task B, and a logical value indicating the output of the task C, and outputs the logical product as the evaluation value of the task X.

Figure 7:
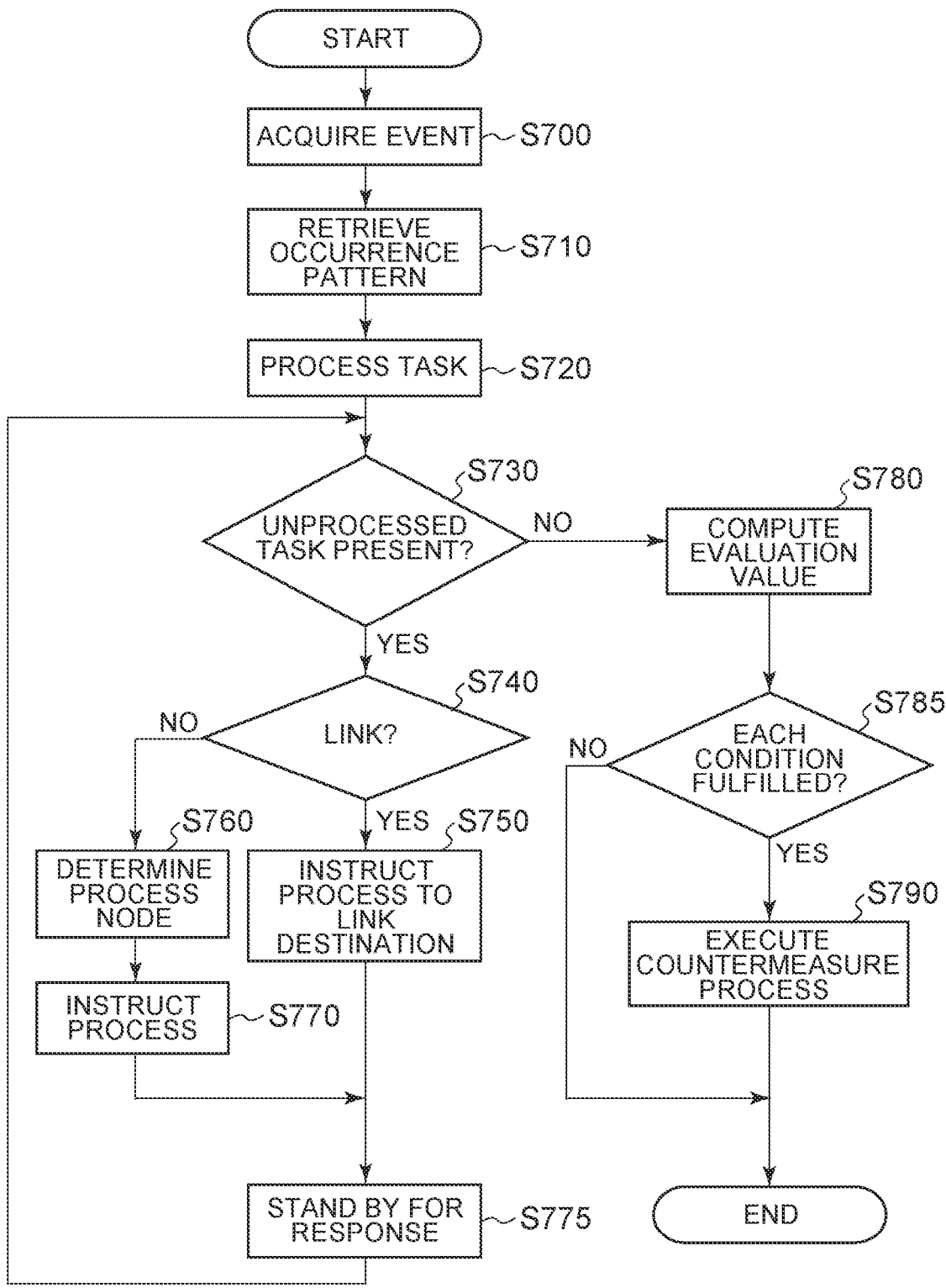
FIG. 7 illustrates a flowchart of a process which is executed by the autonomic manager 102C according to the embodiment in response to the acquisition of an event.

FIG. 7 illustrates a flowchart of a process which is executed by the autonomic manager 102C according to the embodiment in response to the acquisition of an event. Referring to FIG. 7 and FIGS. 10 to 12, the process of the autonomic manager 102C to execute a task in response to the occurrence of an event will be described. First, the selection section 240 and the transfer section 250 acquire events from the application program 108C or receives events transferred from another information processing apparatus adjacent to the information processing apparatus 100C (S700). Events to be acquired are some of all events which have occurred in the information system 10. Only an event included in necessary event data and detectable event data of the information processing apparatus 100C is transferred from the adjacent other information processing apparatus. In addition, the information processing apparatus 100C may acquire an event which is not included in the necessary event data or detectable event data to transfer it to still another information processing apparatus adjacent thereto.

Then, the process determination section 260 retrieves an occurrence pattern including the acquired events from the symptom storage section 200 (S710). Since a plurality of occurrence patterns may be retrieved in S710, the following description will be given of a process to be executed for each of such occurrence patterns. The process execution section 270 reads a plurality of tasks 605 corresponding to an occurrence pattern including the acquired events from symptom data 60 in the symptom storage section 200, and executes a processable task 605 in the read tasks 605 based on the acquired events (S720). The processable task 605 is a task 605 in which all events to be input for the task 605 to evaluate a logical value are included in events acquired by the information processing apparatus 100C.

When the task A has an event 1 and an event 2 as inputs, for example, the task A can be processed by the information processing apparatus 100C if the events 1 and 2 are acquired by the information processing apparatus 100C, whereas the task A cannot be processed by the information processing apparatus 100C if the event 1 alone is acquired by the information processing apparatus 100C. A more specific example is shown in FIG. 9.

Figure 9:
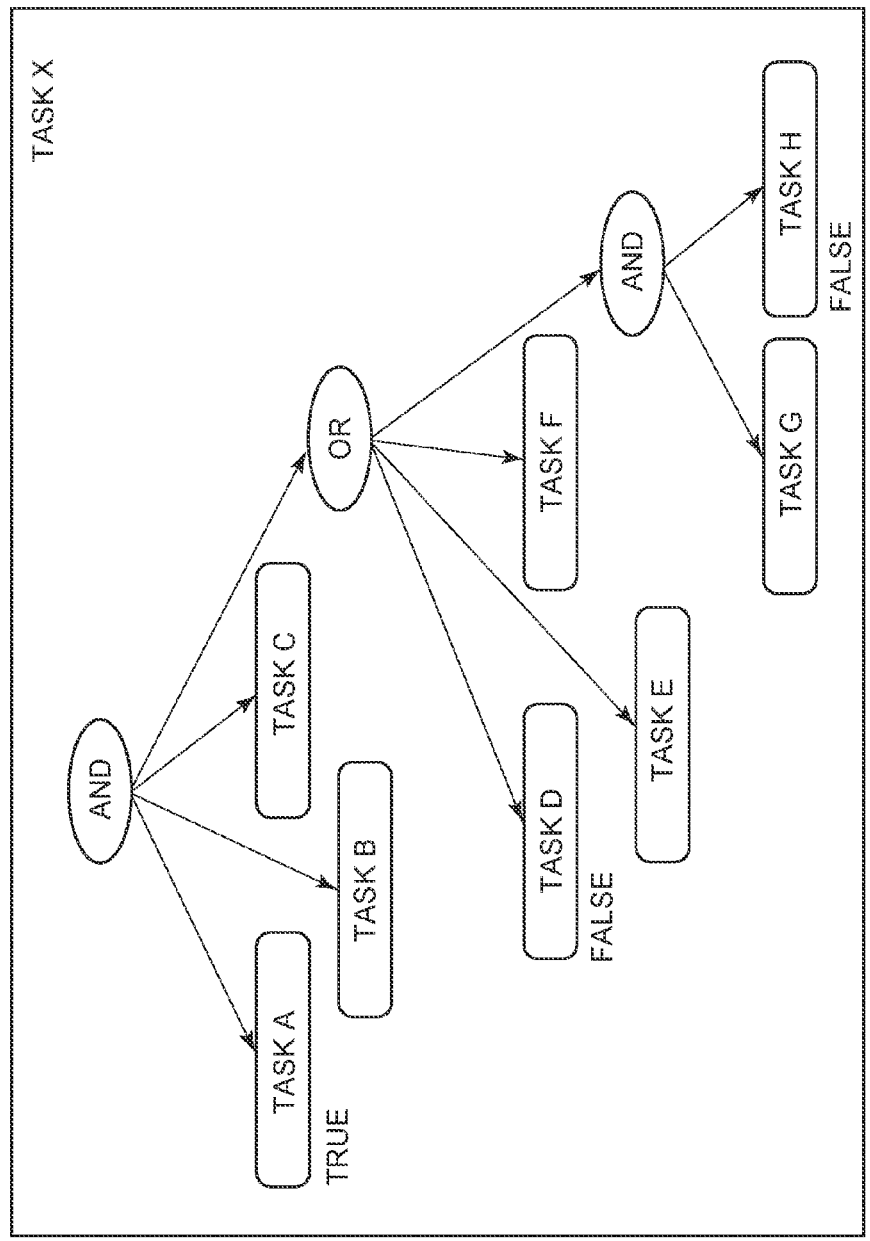
FIG. 9 is a diagram for explaining a specific example of a process of S720.

FIG. 9 is a diagram for explaining a specific example of the process of S720. In this example, only the tasks A, D and H can be processed by the information processing apparatus 100C. As a result of processing those tasks, the evaluation value of the task A becomes a logical value true, the evaluation value of the task D becomes a logical value false, and the evaluation value of the task H becomes a logical value false.

Returning to FIG. 7, the process determination section 260 then determines whether there is any task 605 in a plurality of tasks 605 read in association with an occurrence pattern to be detected which cannot be processed by the process execution section 270 but which needs to be processed to acquire a final output of the logical expression (S730). A specific example of the determination process is shown in FIG. 10.

Figure 10:
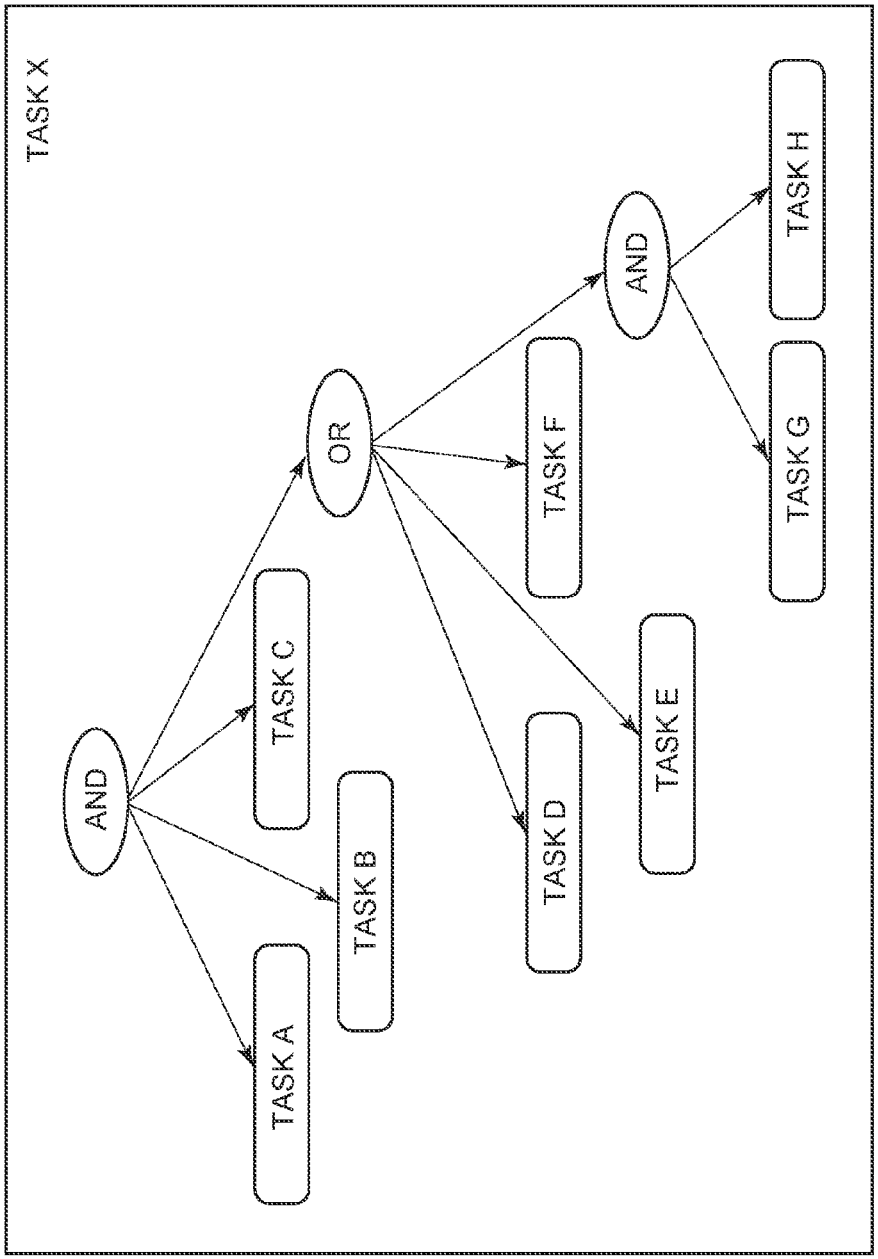
FIG. 10 is a diagram for explaining a specific example of a process of S730.

FIG. 10 is a diagram for explaining a specific example of the process of S730. The process determination section 260 excludes, from a logical expression to be evaluated, a task which need not be processed to compute a final evaluation value, based on logical values output from processed tasks 605. For example, as the process result of the task H is a logical value false, it is determined that the logical product of the process results of the tasks G and H becomes a logical value false. Therefore, the process of the task G is unnecessary to compute a final evaluation value. Accordingly, the process determination section 260 excludes the task G. The process determination section 260 determines that the excluded task 605 which is unprocessed in the logical expression is to be processed by another information processing apparatus. Specifically, the tasks B, C, E and F are those tasks 605 which are processed by other information processing apparatuses.

Returning to FIG. 7, when there is a task 605 to be processed by another information processing apparatus (S730: YES), the process determination section 260 determines whether there is identification information 608 linked to the task 605, i.e., whether identification information 608 stored in association with the task 605 is stored in the symptom storage section 200 (S740). When such identification information 608 is stored (S740: YES), the process determination section 260 instructs a link destination or an information processing apparatus identified by the identification information 608 to execute the task 605 (S750).

When there is no identification information 608 linked to the task 605 (S740: NO), however, the process determination section 260 determines which information processing apparatus should process the task 605 (S760). This determination is made based on, for example, requested event data stored in the node information storage section 220. For example, the process determination section 260 first reads requested event data for another information processing apparatus 100 adjacent to the information processing apparatus 100C from the node information storage section 220. Then, the process determination section 260 determines whether the task 605 to be processed includes an event included in the read requested event data. When the task 605 to be processed includes such an event, the process determination section 260 determines that the task 605 is to be processed by the adjacent other information processing apparatus. As such determination is carried out by each information processing apparatus 100, tasks are sequentially transferred on a graph in which a communication network is seen as a DAG (Directed Acyclic Graph).

Figure 11:
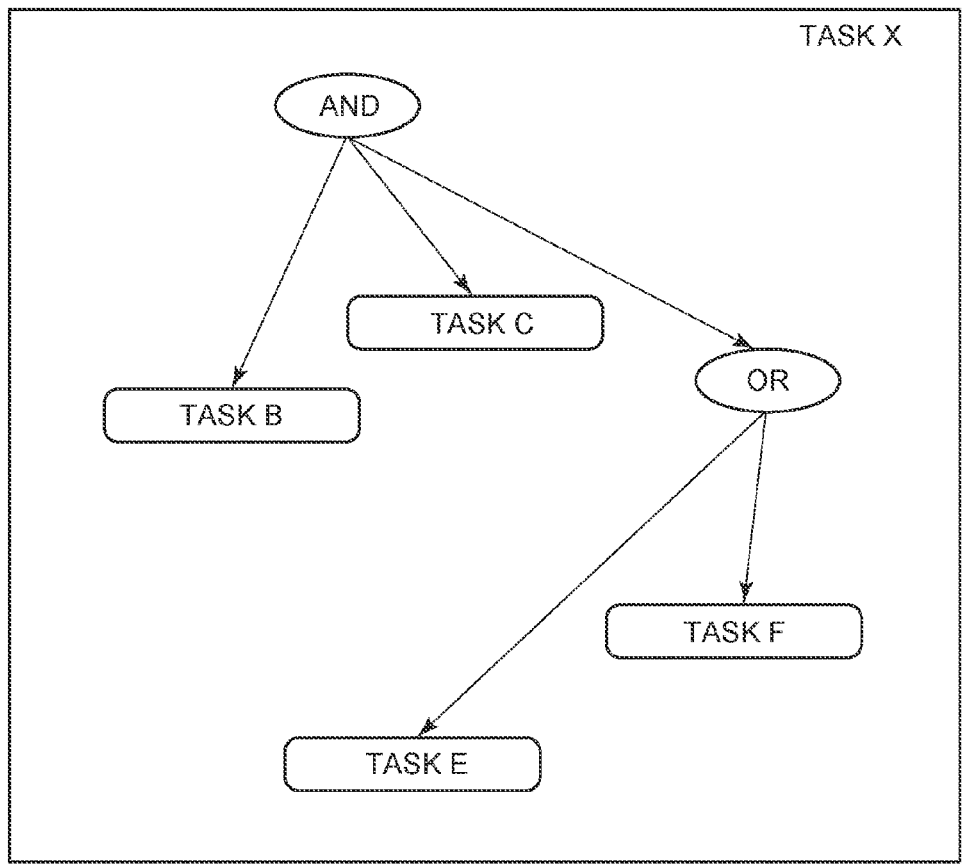
FIG. 11 is a diagram for explaining a specific example of a process of S760.

In response to that determination made by the process determination section 260, the process execution section 270 causes another information processing apparatus to process the task 605 which has been determined to be processed by the other information processing apparatus. Referring to FIG. 11, one example of the process will be described.

FIG. 11 is a diagram for explaining a specific example of the process of S760. First, the process determination section 260 determines whether the logical expression from which a task which need not be processed is excluded includes logical product computation or logical sum computation. In the example of FIG. 11, the logical expression having an unprocessable task excluded therefrom includes computation for acquiring the logical sum of the process results of the tasks E and F and computation for acquiring the logical product of this logical sum and the process results of the tasks B and C. Then, the process determination section 260 causes different information processing apparatuses 100 to respectively process a task included in one partial expression to be subjected to the logical product computation and a task included in the other partial expression to be subjected to the logical product computation. In the example of FIG. 11, the process determination section 260 causes different information processing apparatuses 100 to respectively process the process of the task B and the process of the task C.

Similarly, in the logical sum computation, the process determination section 260 causes different information processing apparatuses 100 to respectively process a task included in one partial expression to be subjected to the logical sum computation and a task included in the other partial expression to be subjected to the logical sum computation. In the example of FIG. 11, the process determination section 260 causes different information processing apparatuses 100 to respectively process the process of the task E and the process of the task F. This can allow different information processing apparatuses 100 to respectively process a plurality of partial expressions to be subjected to the logical sum computation in parallel, thereby making the overall process of detecting an event occurrence pattern efficient.

Returning to FIG. 7, the process execution section 270 stands by until the process result of the task which another information processing apparatus 100 has been instructed to process is returned (S775). When the stand-by time reaches a predetermined upper time limit, which is taken as time-out, it may be determined that a pattern has not been detected. Depending on the structure of a logical expression of tasks to be processed, it is unnecessary to stand by for return of all the process results. An example of the case is illustrated in FIG. 12.

Figure 12:
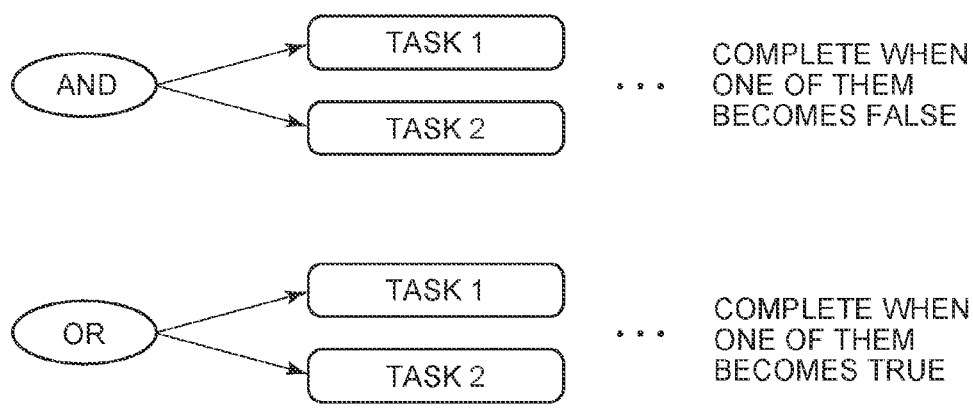
FIG. 12 is a diagram for explaining a specific example of a process of S775.

FIG. 12 is a diagram for explaining a specific example of the process of S775. Under a condition that the evaluation of one partial expression to be subjected to logical product computation is a logical value false, the process execution section 270 determines that the result of the logical product computation is a logical value false even if the evaluation of the other partial expression to be subjected to the logical product computation is not completed, and terminates the stand-by state without waiting for the evaluation of the other partial expression.

Under a condition that the evaluation of one partial expression to be subjected to logical sum computation is a logical value true, the process execution section 270 determines that the result of the logical sum computation is a logical value true even if the evaluation of the other partial expression to be subjected to the logical sum computation is not completed, and terminates the stand-by state without waiting for the evaluation of the other partial expression. When a task 605 outputs some numeral value rather than a logical value and another task 605 executes another process using the numeral value, the process execution section 270 keeps the stand-by state until the process of the other task 605 is completed.

Returning to FIG. 7, the process determination section 260 and the process execution section 270 then return to the process of S730 to determine whether there is an unprocessed task. When one task 605 executes a process referring to the process result of another task 605, as mentioned above, there may be a case where all unprocessed tasks cannot be processed in parallel. In such a case, by returning the flow to the process of S730, tasks at later stages in a plurality of tasks to be processed sequentially can be processed.

When there is no unprocessed task (S730: NO), the process execution section 270 computes an evaluation value indicating if the occurrence pattern has been generated based on the process results of a task processed by the information processing apparatus 100 and a task allowed to be processed by another information processing apparatus 100 (S780). Based on the computed evaluation value, the detection section 280 determines whether a plurality of conditions for determining the generation of an occurrence pattern to be detected are fulfilled (S785). When those conditions are fulfilled (S785: YES), the countermeasure execution section 285 executes a countermeasure process corresponding to the occurrence pattern (S790). The result of executing the countermeasure process may be sent to a predetermined destination information processing apparatus 100.

Like the tasks described above, for a countermeasure process, there are a case where an information processing apparatus which should execute the countermeasure process is predetermined statically and a case where an information processing apparatus which should execute the countermeasure process is not statically determined and thus needs to be determined dynamically. This determination is made, for example, by the process determination section 260. Specifically, the process determination section 260 accesses the symptom storage section 200 to determine whether identification information 622 is associated with countermeasure process data 620. When there is such an association, the process determination section 260 determines that the countermeasure process is executed by the information processing apparatus 100 identified by the identification information 622. In this case, the countermeasure execution section 285 does not execute the countermeasure process designated by the countermeasure process data 620 itself, but sends the countermeasure process data 620 to the information processing apparatus 100 identified by the identification information 622 and causes the information processing apparatus 100 to execute the countermeasure process.

When identification information 622 is not associated with countermeasure process data 620, however, the process determination section 260 accesses the symptom storage section 200 to read the countermeasure process data 620 corresponding to the detected occurrence pattern. Then, the countermeasure execution section 285 attempts to execute the countermeasure process designated by the countermeasure process data 620. When the countermeasure process cannot be executed, the process determination section 260 determines that the countermeasure process is to be executed by another information processing apparatus. The case where the countermeasure process cannot be executed is, for example, a case where the application program 108 to be subjected to the countermeasure process is not running on the information processing apparatus 100C. In that case, the process determination section 260 may inquire other information processing apparatuses 100 if the application program is running, and may cause the information processing apparatus 100 which acknowledges that the application program is running to execute the countermeasure process.

Figure 8:
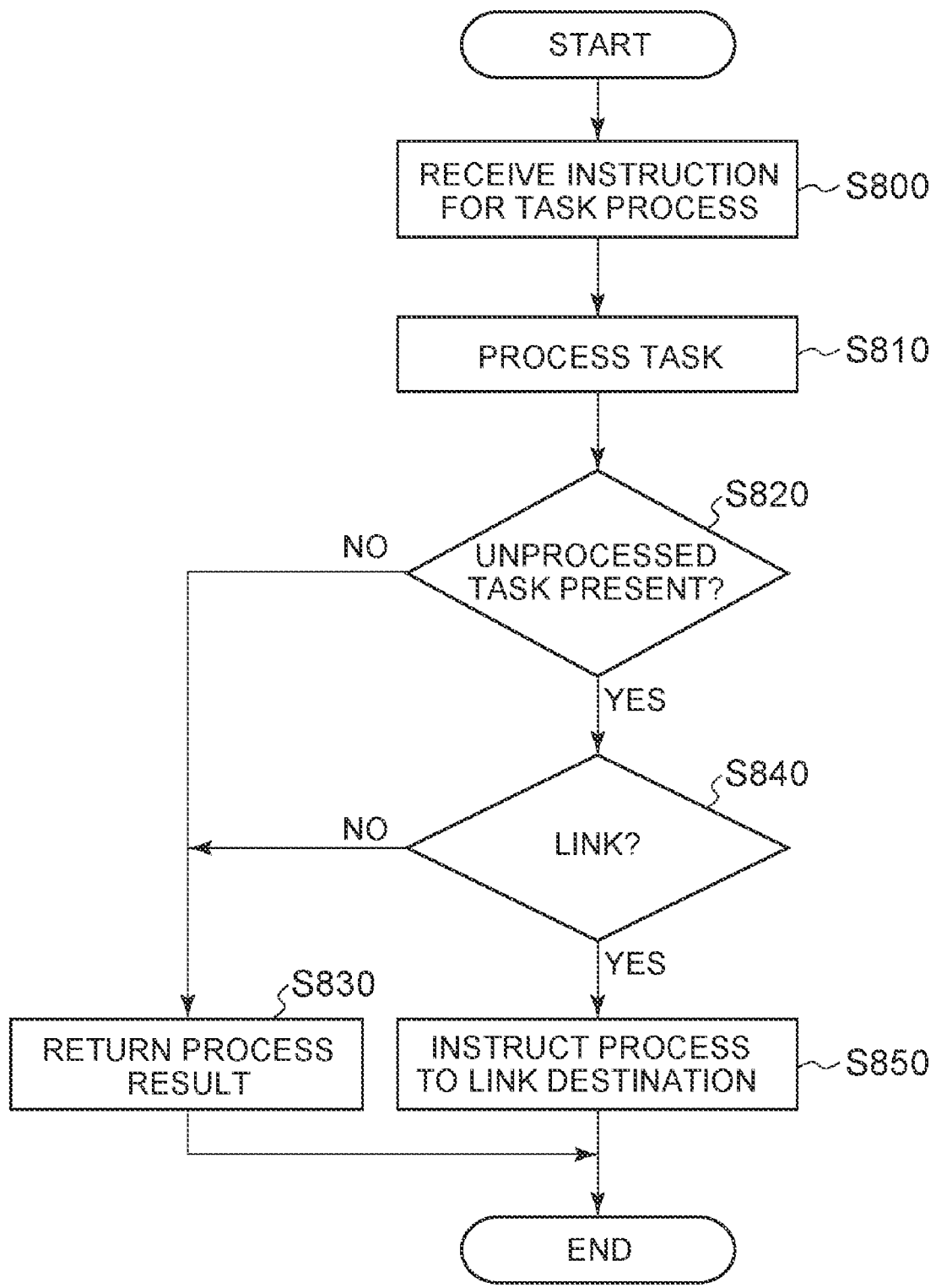
FIG. 8 illustrates a flowchart of a process which is executed by the autonomic manager 102C according to the embodiment in response to a task execution instruction received from another information processing apparatus 100.

FIG. 8 illustrates a flowchart of a process which is executed by the autonomic manager 102C according to the embodiment in response to a task execution instruction received from another information processing apparatus 100. The process execution section 270 receives an instruction to process a task from another information processing apparatus 100 (S800). The process execution section 270 may receive the instruction in association with a task 605 to be processed and corresponding identification information 608. This can allow the task to be processed as instructed even if the task is not stored in the symptom storage section 200. It is assumed here that the information processing apparatus 100C receives the instruction to execute a task from the information processing apparatus 10A.

Next, the process execution section 270 processes the instructed task (S810). The task is processed by the scheme used for the process of S720 discussed above. That is, when a plurality of tasks are designated, the process execution section 270 processes processable tasks among the designated ones based on events stored in the event storage section 210. The "processable task" is a task for which all events to be input to execute that task are stored in the event storage section 210.

Next, the process determination section 260 determines whether there is an unprocessed task in those tasks whose execution has been instructed (S820). When there is no unprocessed task (S820: NO), the process execution section 270 returns the execution result of the processed task to the information processing apparatus 100A (S830). When there is a unprocessed task (S820: YES), the process determination section 260 determines whether the unprocessed task is associated with a link indicating the identification information of the information processing apparatus 100 that is to execute the task (S840). The link corresponds to the identification information 608 in the symptom data 60.

When the unprocessed task is associated with the link (S840: YES), the process execution section 270 instructs the information processing apparatus 100 indicated by the link destination to execute the unprocessed task (S850). When the unprocessed task is not associated with the link (S840: NO), on the other hand, the process execution section 270 proceeds to the process of S830 and returns the process result of the processed task to the information processing apparatus 10A. In this case, the information processing apparatus 100A that has received the process result will select still another information processing apparatus 100 which should execute the unprocessed task.

As described above referring to FIG. 8, even when the information processing apparatus 100C receives a task execution instruction from the information processing apparatus 10A, the process determination section 260 can determine whether the task should be executed by the information processing apparatus 100C or by still another information processing apparatus 100 by referring to events or the like stored in the information processing apparatus 100C. Because the information processing apparatus 100C may execute some of the tasks whose execution has been instructed and instruct still another information processing apparatus to execute other tasks, it is possible to prevent concentration of a load for task distribution only at an apparatus from which pattern detection has started.

Next, a first application example of the information system 10 according to the embodiment will be described referring to FIGS. 13 to 15. This application example is intended to shorten the user's process waiting time by changing the setting of an I/O device according to the use condition of the I/O device.

Figure 13:
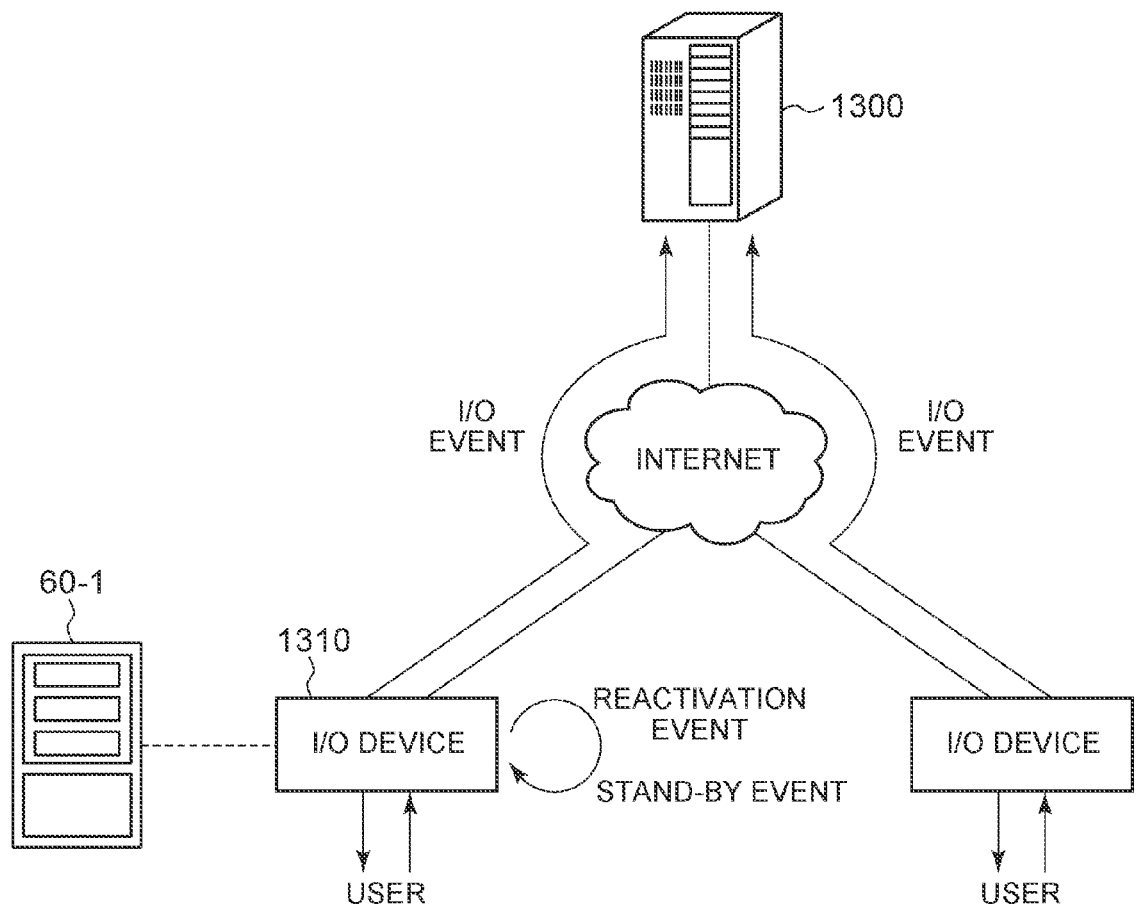
FIG. 13 shows a first application example of the information system 10 according to the embodiment.

FIG. 13 shows the first application example of the information system 10 according to the embodiment. The information system 10 has an I/O device 1310 which is one example of a first information processing apparatus, and a server 1300 which is a second information processing apparatus. The information system 10 may additionally have another I/O device or so.

The I/O device 1310 can be so set as to shift to a power save mode when a predetermined condition is fulfilled, and shifts to a stand-by mode when an I/O instruction is issued in the power save mode. An example of the I/O device 1310 is a printer. Instead, the I/O device 1310 may be another type of I/O device, such as a scanner, a copying machine or a display device. In the power save mode, the power consumption of the printer is low. It is to be noted that even when instructed to print, the printer cannot start printing unless it is shifted to the stand-by mode through a warm-up process. Accordingly, there is some latency until completion of printing. In the stand-by mode, printing can be carried out without going through the warm-up process, but the state after the warm-up process should be maintained, resulting in high power consumption.

The condition for transition from the stand-by mode to the power save mode is, for example, that a predetermined period passes without receiving any I/O instruction. In such a case, since it is unlikely that an instruction is received thereafter, the I/O device 1310 is shifted to the power save mode to reduce the power consumption. When an I/O instruction is received to the contrary to this assumption, however, the I/O device 1310 causes the user to wait due to the warm-up process. The I/O device 1310 stores, in the symptom storage section 200, symptom data 60-1 to detect occurrence of events in a predetermined pattern in the I/O device 1310. The content of the symptom data 60-1 will be described later referring to FIG. 14.

The server 1300 is an apparatus which can communicate with the I/O device 1310 and collects events instructed to be input/output to/from the I/O device 1310 instead thereof. With the information system 10 being large, the I/O device 1310 like a printer is often shared by a plurality of users. Therefore, I/O instructions made by a plurality of users are concentrated on the I/O device 1310. When an I/O instruction is made, an application program for I/O control in the I/O device 1310 generates an event indicating the I/O instruction. Therefore, a lot of events occur in the I/O device 1310.

The storage capacity of the storage device in the I/O device 1310 is very limited, so that not every event may be stored properly. In this case, the I/O device 1310 transfers such events which cannot be stored properly to another information processing apparatus directly connected to the I/O device 1310, e.g., the server 1300. This transfer process may be automatically carried out based on the small storage capacity or in accordance with the setting done by an administrator or the like. In any case, the I/O device 1310 stores the identification information of the transferred event in the event storage section 210 in association with the server 1300 at the transfer destination. Other events which have a low frequency of occurrence are stored in the I/O device 1310.

Figure 14:
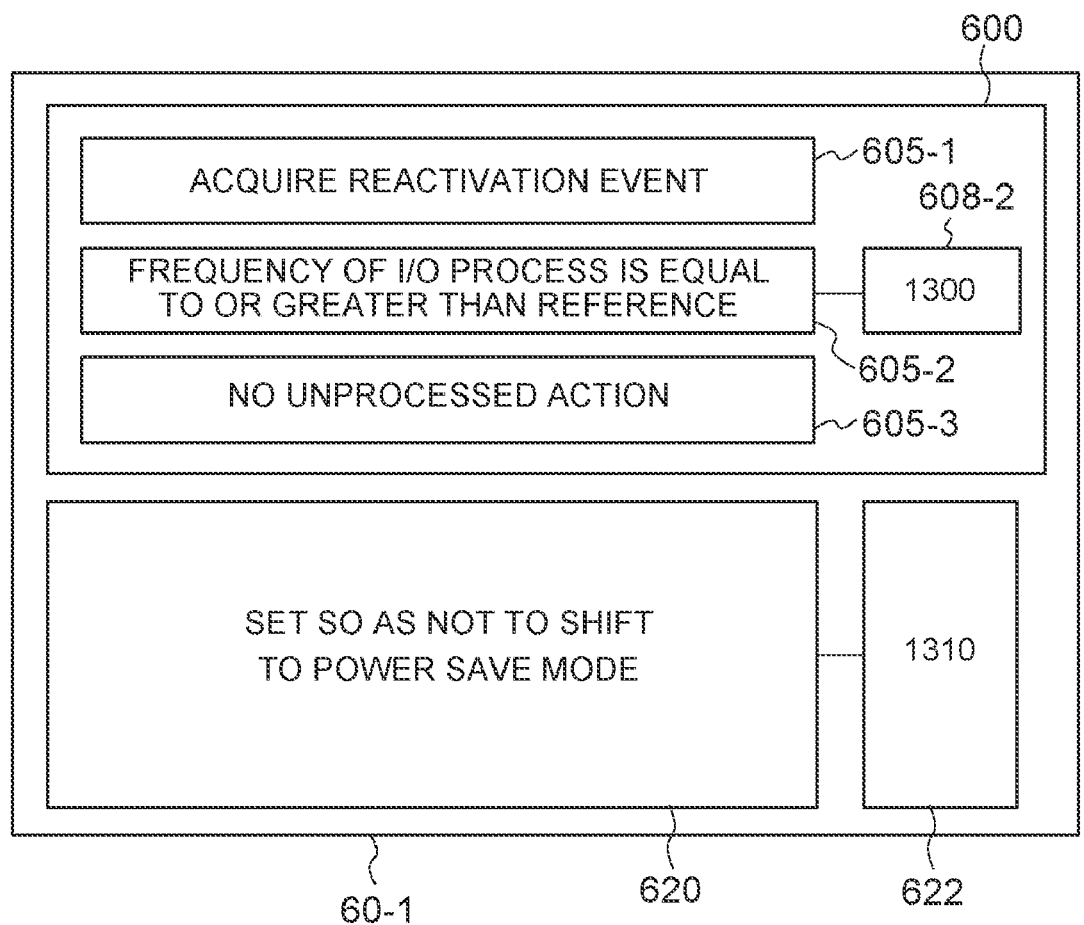
FIG. 14 shows an example of the data structure of symptom data 60-1 in the first application example of the embodiment.

FIG. 14 shows an example of the data structure of symptom data 60-1 in the first application example of the embodiment. The symptom data 60-1 indicates an occurrence pattern of events to be detected in the I/O device 1310, and is included in the symptom storage section 200 of the I/O device 1310. The symptom data 60-1 includes a task 605-1 as one example of the first task, a task 605-2 as one example of the second task, and a task 605-3 as one example of the third task. Further, the symptom data 60-1 stores those tasks in association with the countermeasure process data 620.

The task 605-1 detects that the I/O device 1310 has been reactivated. The task 605-2 determines whether the frequency of I/O processing by the I/O device 1310 is higher than a predetermined reference value. The task 605-2 is associated with identification information 608-2. That is, the association indicates that the task 605-2 should be executed by the server 1300 which is identified by the identification information 608-2. The task 605-3 detects that the I/O device 1310 has no unprocessed actions. The "unprocessed action" is an I/O instruction which has not been completed. Instead, an action to be detected by the task 605-3 may just be an action whose process priority associated with the I/O instruction is higher than a predetermined reference value.

The countermeasure process data 620 indicates a countermeasure process which sets the I/O device 1310 not to shift to the power save mode. Identification information 622 is associated with the countermeasure process data 620. The association indicates that the countermeasure process indicated by the countermeasure process data 620 should be executed by the I/O device 1310 identified by the identification information 622.

Figure 15:
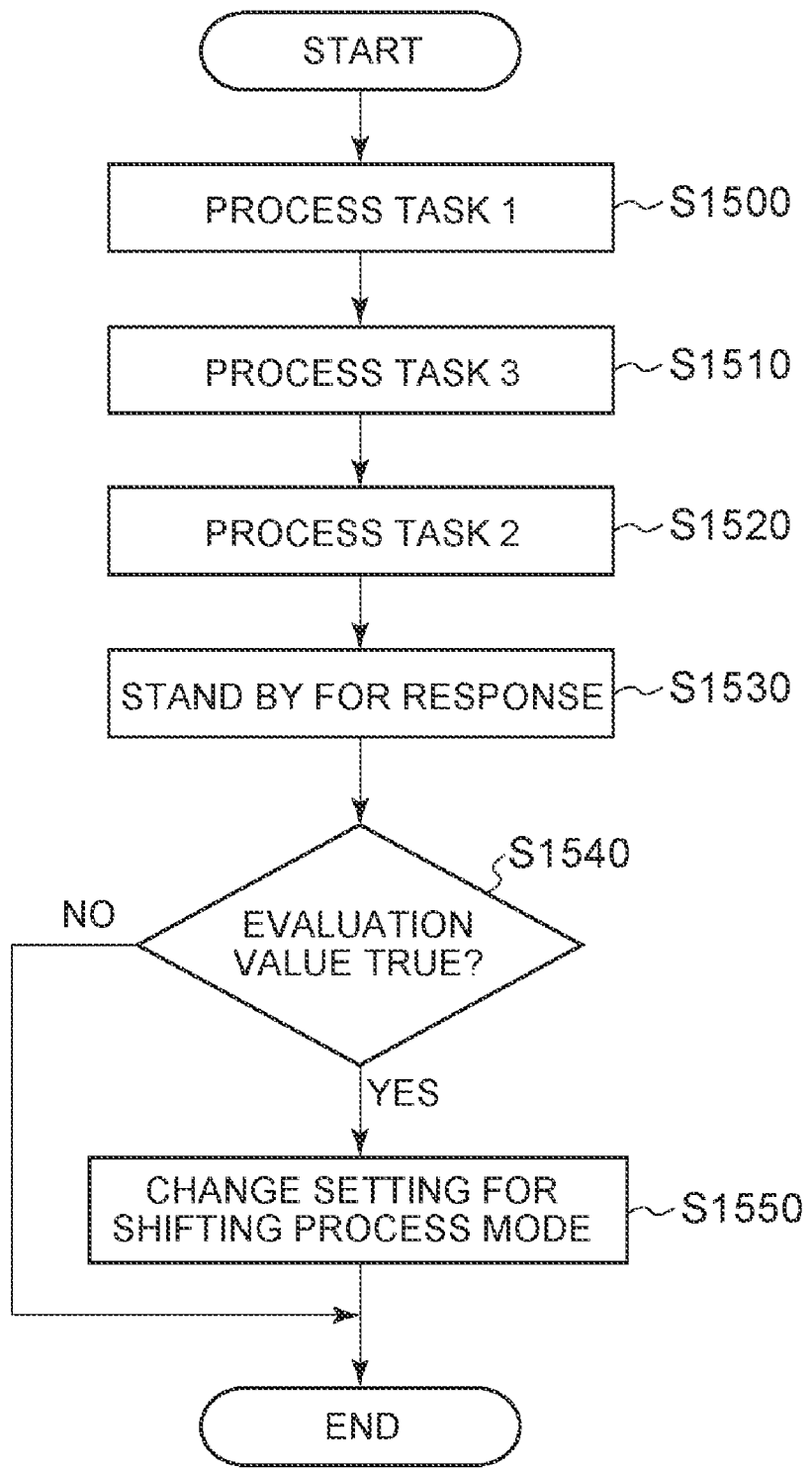
FIG. 15 is a flowchart illustrating the process of an I/O device 1310 in the first application example of the embodiment.

FIG. 15 shows a flowchart illustrating the process of the I/O device 1310 in the first application example of the embodiment. The I/O device 1310 does not transfer an event indicating that the I/O device 1310 has been reactivated to the server 1300, but locally stores the event. Accordingly, the process determination section 260 of the I/O device 1310 determines that the task 605-1 based on the event is to be executed by the I/O device 1310. As a consequence, the process execution section 270 executes the task 605-1 by itself (S1500).

The I/O device 1310 does not transfer an event indicating that the I/O device 1310 has an unprocessed action to the server 1300, but locally stores the event. Accordingly, the process determination section 260 of the I/O device 1310 determines that the task 605-3 based on the event is to be executed by the I/O device 1310. As a consequence, the process execution section 270 executes the task 605-3 by itself (S1510).

The task 605-2 is associated with the identification information 608-2 identifying an information processing apparatus which is allowed to execute the task 605-2. Therefore, the process determination section 260 of the I/O device 1310 determines that the task 605-2 is to be executed by the server 1300. As a consequence, the process execution section 270 causes the server 1300 to execute the task 605-2 (S1520). Then, the I/O device 1310 stands by until the result of the process is returned (S1530).

Next, the I/O device 1310 determines whether the conditions which have been determined by the respective tasks are fulfilled (S1540). For example, the I/O device 1310 determines whether the logical product of logical values indicating the results of the determinations by those tasks, as an evaluation value, is a logical value true. When the conditions are fulfilled (S1540: YES), the countermeasure execution section 285 sets the I/O device 1310 not to shift to the power save mode (S1550).

According to the first application example, as apparent from the above, even when an event cannot be stored in the I/O device 1310 because of its high frequency of occurrence, the event can be kept stored properly in the server 1300. Then, based on events stored in both of the I/O device 1310 and the server 1300, it is possible to adequately determine that events have occurred in a predetermined pattern and perform a countermeasure process according to the determination result. Specifically, the I/O device that has a high frequency of use by the user can be always set to the stand-by mode, thereby shortening the waiting time of the user.

Figure 16:
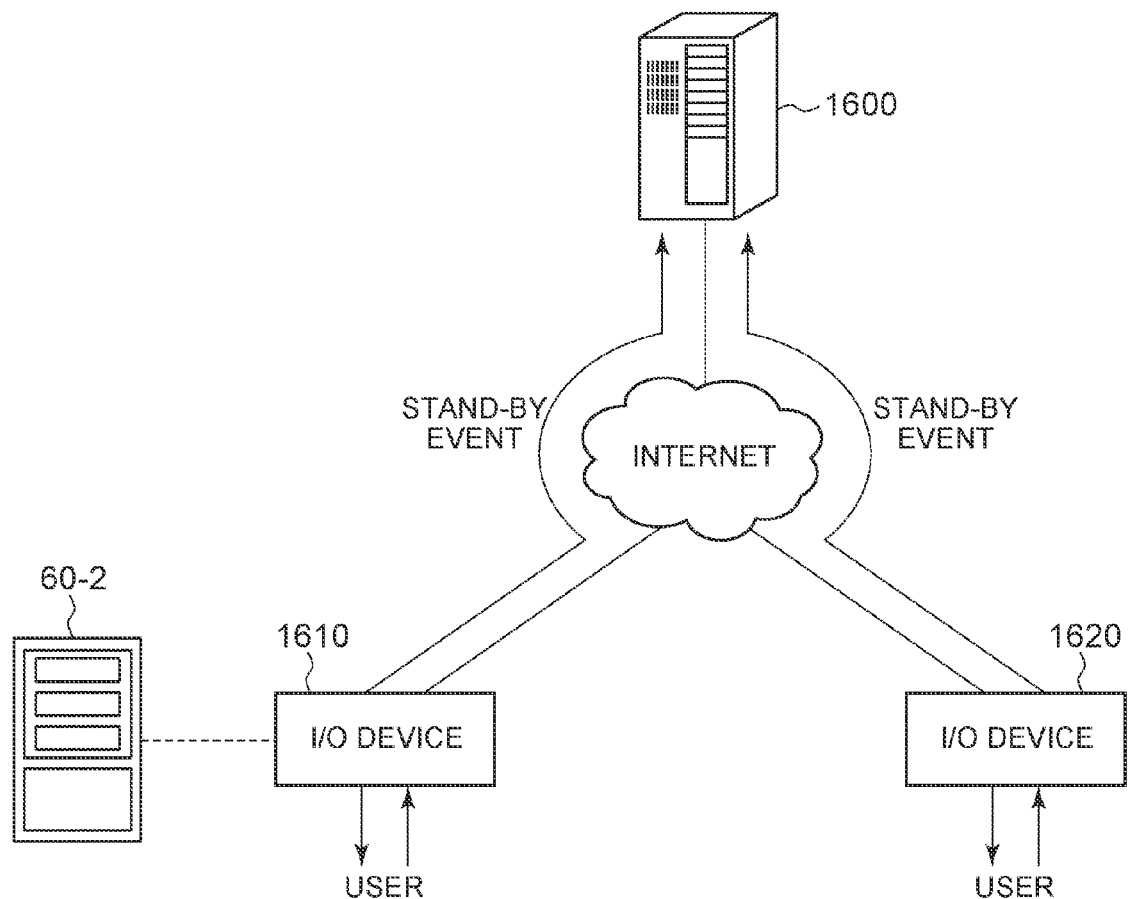
FIG. 16 shows a second application example of the information system 10 according to the embodiment.
Figure 17:
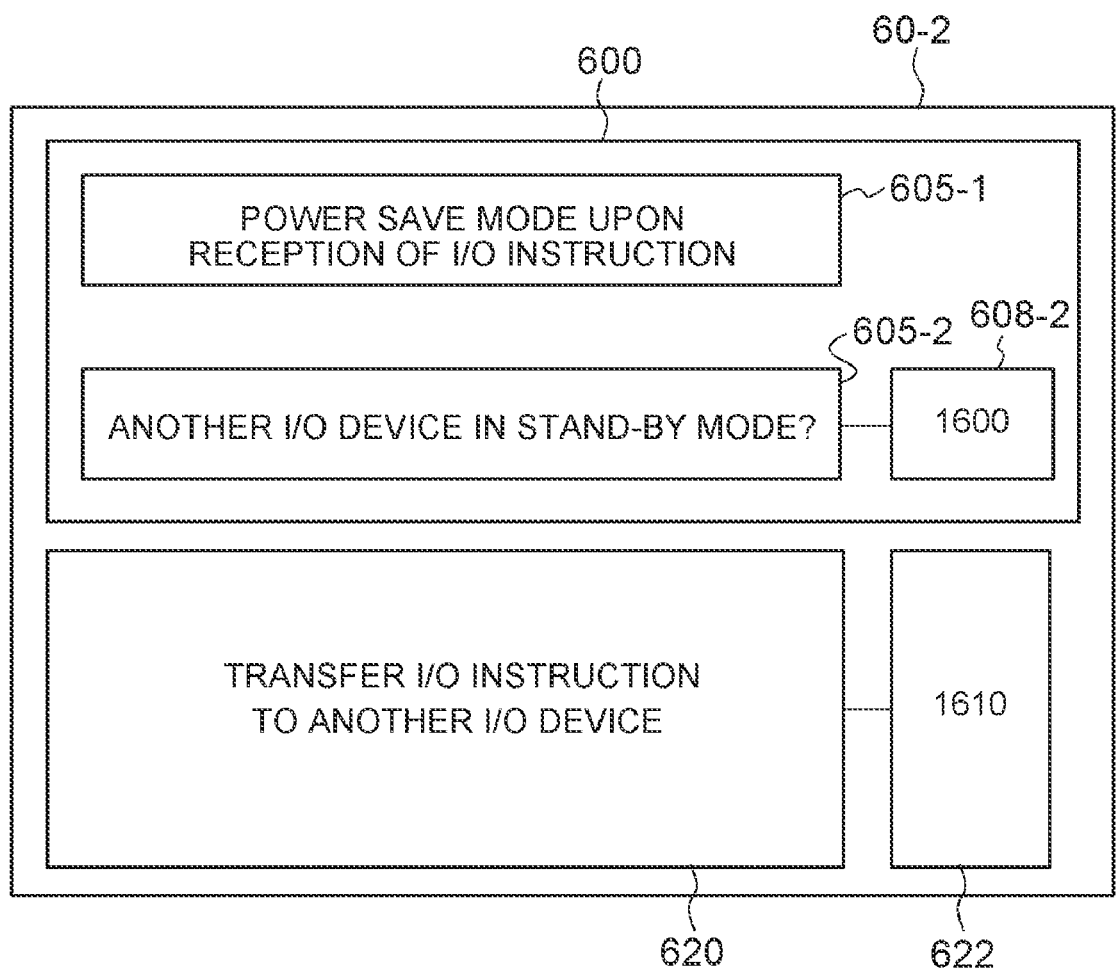
FIG. 17 shows an example of the data structure of symptom data 60-2 in the second application example of the embodiment.
Figure 18:
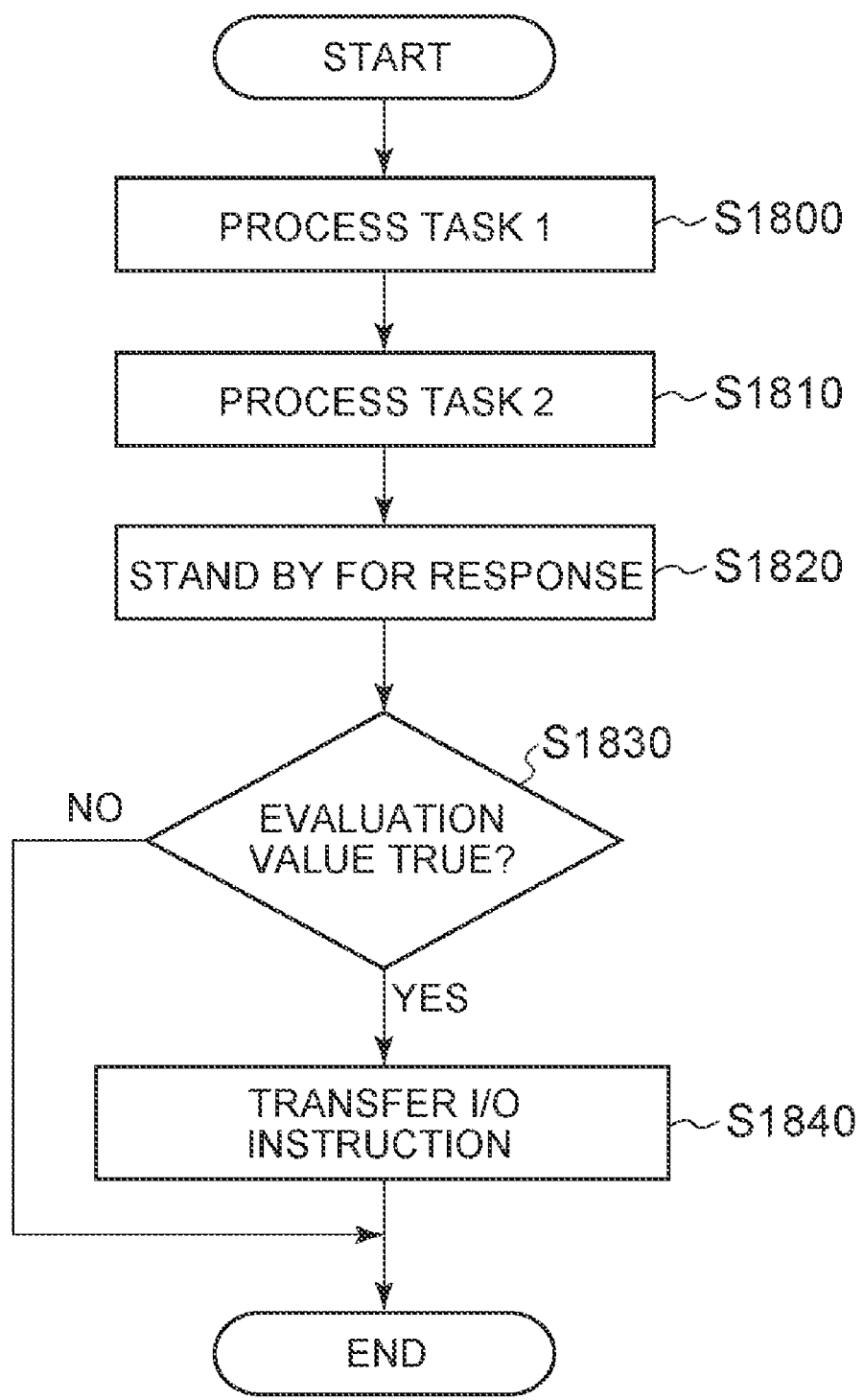
FIG. 18 is a flowchart illustrating the process of an I/O device 1610 in the second application example of the embodiment.

Referring now to FIGS. 16 to 18, a second application example of the information system 10 according to the embodiment will be described. This application example is intended to shorten the user's process waiting time by transferring an I/O instruction received by an I/O device to another I/O device according to the status of the I/O device which has received the instruction.

FIG. 16 shows the second application example of the information system 10 according to the embodiment. The information system 10 has an I/O device 1610 which is one example of a first information processing apparatus, an I/O device 1620 which is one example of a second information processing apparatus, and a server 1600 which is one example of a third information processing apparatus.

When an I/O instruction is given in the power save mode, each of the I/O devices 1610 and 1620 changes to the stand-by mode and performs an I/O process. The server 1600 can communicate with each of the I/O devices 1610 and 1620, and collects, therefrom, events indicating that the process modes of the I/O devices 1610 and 1620 are changed. In each of the I/O devices 1610 and 1620, the identification information of an event transferred to the server 1600 is stored in association with the server 1600 at the transfer destination. The symptom storage section 200 of the I/O device 1610 stores symptom data 60-2. The content of the symptom data will be described referring to FIG. 17.

FIG. 17 shows an example of the data structure of symptom data 60-2 in the second application example of the embodiment. The symptom data 60-2 indicates an occurrence pattern of events to be detected in the I/O device 1610, and is included in the symptom storage section 200 of the I/O device 1610. The symptom data 60-2 includes a task 605-1 as one example of the first task, and a task 605-2 as one example of the second task. Further, the symptom data 60-2 stores those tasks in association with the countermeasure process data 620.

The task 605-1 determines whether an I/O instruction has been issued when the I/O device 1610 is in the power save mode. The task 605-2 determines whether the I/O device 1620 is in the stand-by mode. The task 605-2 is associated with identification information 608-2. That is, the association indicates that the task 605-2 should be executed by the server 1600 which is identified by the identification information 608-2. The countermeasure process data 620 indicates a countermeasure process which transfers an I/O instruction to the I/O device 1620. The identification information 622 is associated with the countermeasure process data 620. The association indicates that the countermeasure process indicated by the countermeasure process data 620 should be executed by the /I/O device 1610 identified by the identification information 622.

FIG. 18 shows a flowchart illustrating the process of the I/O device 1610 in the second application example of the embodiment. The I/O device 1610 locally stores an event indicating that the I/O device 1610 was in the power save mode when the I/O instruction was received. Accordingly, the process determination section 260 of the I/O device 1610 determines that the task 605-1 based on the event is to be executed by the I/O device 1610. As a consequence, the process execution section 270 executes the task 605-1 by itself (S1800).

The task 605-2 is associated with the identification information 608-2 identifying an information processing apparatus which is allowed to execute the task 605-2. Therefore, the process determination section 260 of the I/O device 1610 determines that the task 605-2 is to be executed by the server 1600. As a consequence, the process execution section 270 causes the server 1600 to execute the task 605-2 (S1810). Then, the I/O device 1610 stands by until the result of the process is returned (S1820).

Next, the I/O device 1610 determines whether the conditions which have been determined by the respective tasks are fulfilled (S1830). For example, the I/O device 1610 determines whether the logical product of logical values indicating the results of the determinations by those tasks, as an evaluation value, is a logical value true. When the conditions are fulfilled (S1830: YES), the countermeasure execution section 285 transfers the I/O instruction to the I/O device 1620 (S1840).

According to the second application example, as apparent from the above, even when an event of changing the process mode cannot be stored in the I/O device 1620 because of its high frequency of occurrence, the event can be kept stored properly in the server 1600. Then, based on events stored in both of the server 1600 and the I/O device 1610, it is possible to adequately determine that events have occurred in a predetermined pattern and perform a countermeasure process according to the determination result. Specifically, the I/O device in the power save mode can transfer the received I/O instruction to another I/O device, thereby shortening the waiting time of the user.

Figure 19:
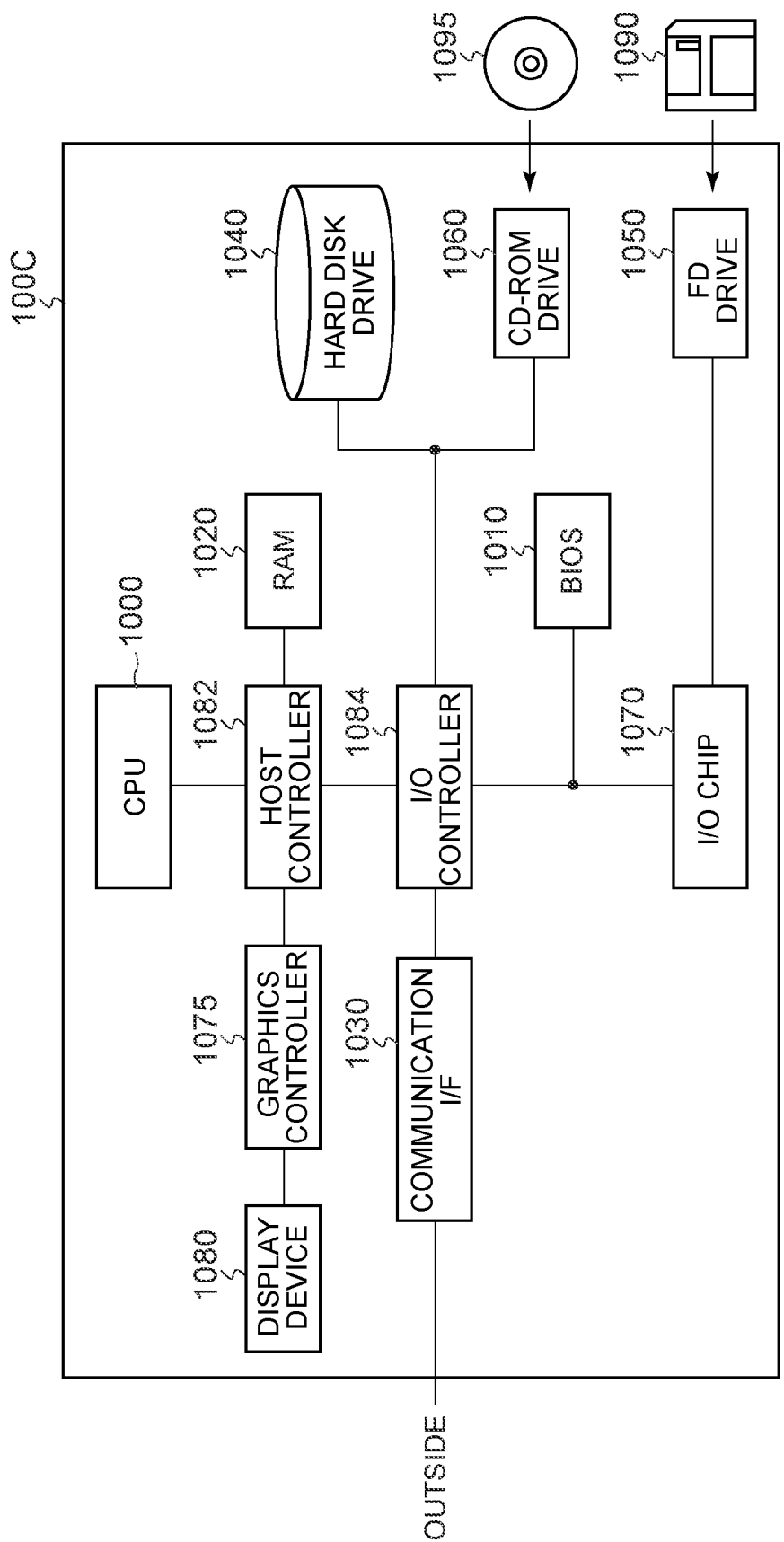
FIG. 19 is a diagram showing one example of the hardware configuration of the information processing apparatus 100C according to the embodiment.

FIG. 19 shows one example of the hardware configuration of the information processing apparatus 100C according to the embodiment which serves as the terminal device 20 or the management device 30. The information processing apparatus 100C includes a CPU-related section, an input/output section, and a legacy input/output section. The CPU-related section has a CPU 1000, a RAM 1020 and a graphics controller 1075, which are mutually connected by a host controller 1082. The input/output section has a communication interface 1030 (corresponding to the communication interface 106C in FIG. 1), a hard disk drive 1040 (corresponding to the storage device 104C in FIG. 1) and a CD-ROM drive 1060, which are connected to the host controller 1082 by an input/output controller 1084. The legacy input/output section has a ROM 1010, a flexible disk drive 1050 and an input/output chip 1070, which are connected to the input/output controller 1084.

The host controller 1082 connects the RAM 1020 to the CPU 1000 and the graphics controller 1075, which access the RAM 1020 at a high transfer rate. The CPU 1000 operates to control the individual sections based on programs stored in the ROM 1010 and the RAM 1020. The graphics controller 1075 acquires image data which is generated by the CPU 1000 or the like on a frame buffer provided in the RAM 1020. Instead, the graphics controller 1075 may include a frame buffer inside to store image data generated by the CPU 1000 or the like.

The input/output controller 1084 connects the host controller 1082 to the communication interface 1030, the hard disk drive 1040 and the CD-ROM drive 1060, which are relatively fast input/output devices. The communication interface 1030 communicates with an external device over a network. The hard disk drive 1040 stores programs and data which the information processing apparatus 100C uses. The CD-ROM drive 1060 reads programs and data from a CD-ROM 1095, and provides the RAM 1020 or the hard disk drive 1040 with the programs and data.

The input/output controller 1084 is connected with relatively slow input/output devices, such as the flexible disk drive 1050 and the input/output chip 1070. The ROM 1010 stores a boot program which is executed by the CPU 1000 when the information processing apparatus 100C is activated, and programs which depend on the hardware of the information processing apparatus 100C. The flexible disk drive 1050 reads programs and data from a flexible disk 1090, and provides the RAM 1020 or the hard disk drive 1040 with the programs and data via the input/output chip 1070. The input/output chip 1070 connects flexible disk 1090 and various kinds of input/output devices via, for example, a parallel port, a serial port, a keyboard port, a mouse port and so forth.

The program to be provided to the information processing apparatus 100C is stored in a recording medium, such as the flexible disk 1090, the CD-ROM 1095 or an IC card, and provided by a user. The program is read from the recording medium via the input/output chip 1070 and/or the input/output controller 1084, and is installed and executed on the information processing apparatus 100C. Because the operations which the program allows the information processing apparatus 100C or the like to execute are the same as the operations of the information processing apparatus 100C which have been explained referring to FIGS. 1 to 18, their descriptions will be omitted.

The program described above may be stored in an external storage medium. An optical recording medium, such as DVD or PD, a magnetooptical recording medium, such as MD, a tape medium, a semiconductor memory, such as an IC card, and the like can be used as storage media in addition to the flexible disk 1090 and the CD-ROM 1095. A storage device, such as a hard disk or RAM, provided at a server system connected to a private communication network or the Internet can be used as a recording medium to provide the information processing apparatus 100C with the program over the network.

Because the hardware configuration of each of the information processing apparatus 100A, the information processing apparatus 100B, the information processing apparatus 100D and the information processing apparatus 100E is substantially identical to the information processing apparatus 100C, its description will be omitted.

According to the embodiment described above referring to FIGS. 1 to 18, the process of detecting an occurrence pattern of events can be shared by a plurality of information processing apparatuses. This can achieve pattern detection based on events occurred at the respective locations in the information system 10 and can distribute the process load of the detection task. Particularly, a plurality of tasks which are processed in a distributed manner can be processed in parallel as much as possible, thereby ensuring efficient processing. Further, each information processing apparatus stores a collection of events needed by another information processing apparatus adjacent to that information processing apparatus, and can therefore dynamically determine which task should be transferred to which information processing apparatus. This eliminates the need for transferring the entire data of events every time pattern detection is carried out, thus relieving the communication traffic and ensuring efficient processing.

Although the embodiment of the present invention has been described above, the technical scope of the invention is not limited to the scope of the above-described embodiment. It should be apparent to those skilled in the art that various changes and improvements can be made to the embodiment. It is apparent from the description of the appended claims that such changed or improved embodiments are encompassed in the technical scope of the invention.

What is claimed is:

1. A system that has a plurality of information processing apparatuses and detects if events have occurred in the plurality of information processing apparatuses in a predetermined occurrence pattern, one of the plurality of information processing apparatuses comprising:

a storage device that stores, for each occurrence pattern of events to be detected, a plurality of tasks for respectively determining whether a plurality of conditions are fulfilled;

a process determination section that, in response to occurrence of an event, searches the storage device for an occurrence pattern including the event, reads the plurality of tasks corresponding to the searched occurrence pattern from the storage device, and determines which information processing apparatus is assigned to process each of the read tasks;

a process execution section that processes a first task determined to be assigned to said one information processing apparatus, and instructs another information processing apparatus to process another task determined to be assigned to said another information processing apparatus; and a detection section that determines that the event has occurred in the occurrence pattern under a condition that the first task processed by the one information processing apparatus and the another task processed by the another information processing apparatus fulfill the plurality of conditions.

2. The system according to claim 1, wherein the plurality of tasks respectively output logical values as process results, an occurrence pattern of events to be detected is associated with a logical expression combining the output logical values, and it is determined whether the occurrence pattern has been detected based on an evaluation value of the logical expression, and in the one information processing apparatus:

the process execution section acquires at least one event which occurred in said one information processing apparatus or in another information processing apparatus, searches the storage device and reads therefrom a plurality of tasks corresponding to an occurrence pattern including the acquired event, and processes the first task processable based on the acquired event among the plurality of tasks read, the process determination section excludes the another task which need not be processed in computing the evaluation value, from a logical expression to be evaluated, based on the logical value output by the processed task, and determines that the unprocessed the another task in the excluded logical expression is caused to be processed by the another information processing apparatus, the process execution section computes an evaluation value of the logical expression based on outputs of the first task processed by one information processing apparatus and the another task caused to be processed by the another information processing apparatus, and based on the computed evaluation value, the detection section determines that the event has occurred in the occurrence pattern.

3. The system according to claim 2, wherein the first task comprises a first partial expression which determines the ID and attribute of each of a plurality of events, the another task comprises another partial expression which determines the ID and attribute of each of a plurality of events, and the task and the another task evaluate a logical expression based on the determination results; and in the one information processing apparatus, under a condition that the logical expression excluding the another task which need not be processed includes a logical product computation, the process determination section causes the one information processing apparatus assigned to process the first task to process the first task included in the first partial expression to be subjected to the logical product computation and the determination section causes the another information processing apparatus assigned to process the another task to process the another task included in the another partial expression to be subjected to the logical product computation, and under a condition that the logical expression excluding the another task which need not be processed includes a logical sum computation, the process determination section causes the one information processing apparatus assigned to process the task comprising the one partial expression to process evaluation of said first partial expression to be subjected to the logical sum computation and the determination section causes the another information processing apparatus assigned to process the another task comprising the another partial expression to process evaluation of said another partial expression to be subjected to the logical sum computation.

4. The system according to claim 3, wherein in the one information processing apparatuses, under a condition that processed evaluation of the one partial expression to be subjected to the logical product computation is a logical value false, the process execution section determines that a result of the logical product computation is a logical value false even if evaluation of the another partial expression to be subjected to the logical product computation has not been completed, and under a condition that processed evaluation of the one partial expression to be subjected to the logical sum computation is a logical value true, the process execution section determines that a result of the logical sum computation is a logical value true even if evaluation of the another partial expression to be subjected to the logical sum computation has not been completed.

5. The system according to claim 1, wherein in the one information processing apparatus, upon receipt of an instruction to process a third task from a second information processing apparatus, the process determination section determines whether the third task is assigned to be processed by the one information processing apparatus receiving the instruction or is assigned to be processed by a third information processing apparatus, and the process execution section processes the third task if the third task has been determined to be assigned to be processed by the one information processing apparatus receiving the instruction, instructs the third information processing apparatus to process the third task if the third task has been determined to be assigned to be processed by the third information processing apparatus, and returns both process results in combination to the second information processing apparatus which sent the instruction.

6. The system according to claim 1, wherein in each of the information processing apparatuses, the storage device stores, in association with each of the plurality of tasks, identification information identifying the information processing apparatus which is assigned to process the task, and in response to occurrence of the event, the process determination section reads each of the plurality of tasks corresponding to the occurrence pattern including the event from the storage device in association with the identification information corresponding to the task, and causes the information processing apparatus which is identified by the identification information read in association with the task to process the task.

7. The system according to claim 1, wherein the one information processing apparatus includes a generation section that specifies occurrence patterns of events detectable in said one information processing apparatus based on processing capability and process load of said one information processing apparatus, generates detectable event data indicating a collection of events included in any of the specified occurrence patterns, and notifies the another information processing apparatus adjacent to said one information processing apparatus of generation of the detectable event data, and in the one information processing apparatus,
the storage device stores, for each of a plurality of other information processing apparatuses adjacent to said one information processing apparatus, a collection of events included in the detectable event data of the respective adjacent other information processing apparatuses or included in a collection of necessary event data of a non-adjacent other information processing apparatus adjacent to any of the adjacent other information processing apparatuses, as requested event data indicating a collection of events requested for transfer by the respective adjacent other information processing apparatus, and the process determination section reads the requested event data on each adjacent other information processing apparatus from the storage device of the respective adjacent other information processing apparatus, and causes the respective adjacent other information processing apparatus to process a task included in an event included in the read requested event data.

8. The system according to claim 1, wherein for the occurrence pattern of events to be detected, the storage device stores a countermeasure process which is executed when events have occurred in that occurrence pattern, the process determination section further determines which information processing apparatus is to execute the countermeasure process, and under a condition that events have occurred in the occurrence pattern to be detected, the process execution section causes the information processing apparatus which has been determined by the process determination section to execute the countermeasure process corresponding to the occurrence pattern including the events that have occurred.

9. The system according to claim 8, wherein for each occurrence pattern of events to be detected, the storage device stores identification information of the information processing apparatus which is to execute the countermeasure process in association with the countermeasure process, and the process determination section reads the identification information stored in association with the countermeasure process from the storage device, and determines that the information processing apparatus identified by the read identification information is caused to execute the countermeasure process.

10. The system according to claim 7, wherein in the one information processing apparatus, the generation section updates the generated detectable event data based on changes in the processing capability and the process load of the one information processing apparatus, and sends the updated detectable event data to at least one adjacent other information processing apparatus to cause the adjacent other information processing apparatus to update necessary event data.

11. An information processing system, comprising:
a first information processing apparatus which is an input/output device that can be set to shift to a power save mode when a predetermined condition is fulfilled, and shifts to a standby mode when an input/output is instructed in the power save mode,
a second information processing apparatus which is a server that can communicate with the first information processing apparatus and collects events, which the input/output device has been instructed to input/output, and wherein, for an occurrence pattern of events to be detected, a storage device in the first information processing apparatus stores: a first task of detecting that the input/output device is reactivated, a second task of determining whether a frequency of input/output processing by the input/output device is higher than a predetermined reference value, and a third task of detecting that the input/output device has no unprocessed action, in association with a countermeasure process of setting the input/output device not to shift to the power save mode, a process determination section in the first information processing apparatus determines that the first and third tasks are processed by the input/output device and the second task is processed by the server, a detection section in the first information processing apparatus determines that the occurrence pattern to be detected has been detected under a condition that each result of determination on the first task, the second task and the third task is a logical value true, and the first information processing apparatus further includes a countermeasure execution section that sets the input/output device not to shift to the power save mode under a condition that the occurrence pattern to be detected has been detected.

12. An information processing system, comprising: a first information processing apparatus and a second information processing apparatus each being an input/output device that shifts to a standby mode when an input/output is instructed in a power save mode, a third information processing apparatus which is a server that can communicate with each of the first and second information processing apparatuses and collects events in which a process mode of the second information processing apparatus has been changed, wherein for an occurrence pattern of events to be detected, a storage device in the first information processing apparatus stores a first task of determining whether an input/output is instructed when the first information processing apparatus is in the power save mode, and a second task of determining whether the second information processing apparatus is in the standby mode, in association with a countermeasure process of transferring an input/output instruction to the second information processing apparatus, a process determination section in the first information processing apparatus determines that the first task is processed by the first information processing apparatus and the second task is processed by the server, a detection section in the first information processing apparatus determines that the occurrence pattern to be detected has been detected under a condition that each result of determination on the first and second tasks is a logical value true, and the first information processing apparatus further includes a countermeasure execution section that transfers the input/output instruction to the second information processing apparatus under a condition that the occurrence pattern to be detected has been detected.

13. An information processing apparatus that is provided in an information system comprising a plurality of information processing apparatuses and detects if events have been detected in the information system in at least one predetermined occurrence pattern, a first information processing apparatus comprising:

a storage device that stores, for each occurrence pattern of events to be detected, a plurality of tasks assigned to be processed by respective ones of the plurality of information processing apparatuses for respectively determining whether a plurality of conditions are fulfilled;

a process determination section that, in response to occurrence of an event, searches the storage device for an occurrence pattern including the event, reads a plurality of tasks corresponding to the searched occurrence pattern from the storage device, and determines which of the plurality of information processing apparatuses is assigned to process each of the read tasks;

a process execution section that processes a task determined to be assigned to be processed by the first information processing apparatus, and instructs another information processing apparatus to process another task determined to be assigned to be processed by the another information processing apparatus; and a detection section that determines that the event has occurred in the predetermined occurrence pattern under a condition that process results of the task processed by the first information processing apparatus and the another task instructed to be processed by the another information processing apparatus fulfill the plurality of conditions.

14. A method of detecting if events have been detected in an information system comprising a plurality of information processing apparatuses in at least one predetermined occurrence pattern by using a first information processing apparatus provided in the information system, the first information processing apparatus having a storage device that stores, for each occurrence pattern of events to be detected, a plurality of tasks assigned to be processed by respective ones of the plurality of information processing apparatuses for respectively determining whether a plurality of conditions are fulfilled, the method comprising the steps of:

in response to occurrence of an event, searching the storage device for an occurrence pattern including the event, reading a plurality of tasks corresponding to the searched occurrence pattern from the storage device, and determining which information processing apparatus is assigned to process each of the read tasks;

processing a task determined to be assigned to be processed by the first information processing apparatus, and instructing another information processing apparatus to process another task determined to be assigned to be processed by the another information processing apparatus; and determining that the event has occurred in the predetermined occurrence pattern under a condition that results of the task processed by the first information processing apparatus and the another task instructed to be processed by the another information processing apparatus fulfill the plurality of conditions.

15. A computer program product comprising a non-transitory storage medium having encoded thereon program instructions which, when executed by a computer, cause a first information processing apparatus, provided in an information system comprising a plurality of information processing apparatuses, to detect if events have been detected in the information system in a predetermined occurrence pattern by using the first information processing apparatus provided in the information system, the first information processing apparatus having a storage device that stores, for each occurrence pattern of events to be detected, a plurality of tasks for respectively determining whether a plurality of conditions are fulfilled, the program instructions causing the information processing apparatus to function as:

a process determination section that, in response to occurrence of an event, searches the storage device for an occurrence pattern including the event, reads a plurality of tasks corresponding to the searched occurrence pattern from the storage device, and determines which information processing apparatus is assigned to process each of the read tasks;

a process execution section that processes a first task determined to be assigned to the first information processing apparatus, and instructs another information processing apparatus to process another task determined to be assigned to said another information processing apparatus; and a detection section that determines that the event has occurred in the occurrence pattern under a condition that process results of the first task processed by the first information processing apparatus and the another task instructed to be processed by the another information processing apparatus fulfill the plurality of conditions.

* * * * *